United States Patent
Hernandez et al.

(10) Patent No.: US 10,117,084 B2
(45) Date of Patent: Oct. 30, 2018

(54) CONTEXT-DEPENDENT ALLOCATION OF SHARED RESOURCES IN A WIRELESS COMMUNICATION INTERFACE

(71) Applicant: Apple Inc., Cupertino, CA (US)

(72) Inventors: Diego C. Hernandez, San Mateo, CA (US); Indranil S. Sen, Cupertino, CA (US); Raghuram C. Kamath, San Jose, CA (US); Harneet Singh Oberoi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/619,142

(22) Filed: Jun. 9, 2017

(65) Prior Publication Data
US 2018/0091962 A1  Mar. 29, 2018

Related U.S. Application Data

(60) Provisional application No. 62/399,015, filed on Sep. 23, 2016.

(51) Int. Cl.
*H04W 4/90* (2018.01)
*H04M 1/725* (2006.01)
*G01S 19/17* (2010.01)
*H04W 76/50* (2018.01)
*H04W 84/04* (2009.01)

(52) U.S. Cl.
CPC ............... *H04W 4/90* (2018.02); *G01S 19/17* (2013.01); *H04M 1/72536* (2013.01); *H04W 76/50* (2018.02); *H04W 84/042* (2013.01); *H05K 999/99* (2013.01)

(58) Field of Classification Search
CPC ....... H04W 4/90; H04W 4/22; H04W 76/007; H04W 76/50; H04W 84/042; G01S 19/17; H04M 1/72536
See application file for complete search history.

(56) References Cited

U.S. PATENT DOCUMENTS

| | | | |
|---|---|---|---|
| 9,357,495 B2 | 5/2016 | Birnbaum et al. | |
| 2002/0003491 A1 | 1/2002 | Heppe | |
| 2002/0154058 A1* | 10/2002 | Pande | G01S 5/0009 701/468 |
| 2003/0050039 A1* | 3/2003 | Baba | H04M 1/72538 455/404.1 |
| 2009/0274079 A1 | 11/2009 | Bhatia et al. | |
| 2016/0329395 A1 | 12/2012 | Husted et al. | |
| 2013/0148636 A1 | 6/2013 | Lum et al. | |
| 2014/0045450 A1* | 2/2014 | Ballantyne | H04W 4/90 455/404.2 |
| 2017/0153694 A1* | 6/2017 | Baldwin | G06F 1/3296 |

* cited by examiner

*Primary Examiner* — Mehmood B. Khan
(74) *Attorney, Agent, or Firm* — Kilpatrick Townsend & Stockton LLP

(57) ABSTRACT

Resource allocation logic in a user device can determine allocation of a shared resource among different communication modules supporting a number of different communication types (e.g., GNSS, cellular, Wi-Fi, and/or Bluetooth communications) in a context-dependent manner. For example, the logic can determine an operating context of the user device. Based on the operating context, the logic can assign a priority to each of the signal types. The shared resource can be allocated among the signal types based on the priority.

18 Claims, 17 Drawing Sheets

*1100*

| WLAN Access Category (*1104*) | RSSI Threshold (dBm) (*1102*) |
|---|---|
| BE | > -85 |
| BK | > -80 |
| VI | > -75 |
| VO | > -75 |

*FIG. 11*

| Bluetooth Link Type | RSSI Threshold (dBm) | Packet Error Rate |
|---|---|---|
| ACL | > -85 | X1% |
| SCO | > -80 | X2% |

*FIG. 14*

CONTEXT-DEPENDENT ALLOCATION OF SHARED RESOURCES IN A WIRELESS COMMUNICATION INTERFACE

CROSS-REFERENCE TO RELATED APPLICATION

This application claims the benefit of U.S. Provisional Application No. 62/399,015, filed Sep. 23, 2016, the disclosure of which is incorporated herein by reference.

BACKGROUND

This disclosure relates to management of a shared wireless communication interface and in particular to context-dependent allocation of shared resources between different communication technologies.

"Smart" phones allow users to do a number of different tasks more easily and efficiently than ever before. For example, smart phones typically include a cellular voice interface that allows the user to make and receive phone calls and a cellular data interface that allows the user to access the Internet. Most smart phones may also include other wireless communication interfaces, such as Wi-Fi or Bluetooth or the like. Another service that smart phones typically provide is a location (or position) determination service using a global navigation satellite system (GNSS), such as the Global Positioning System (GPS) developed in the US, the Russian GLONASS system, or other similar systems that may be deployed in the future. The location determination service may operate by receiving signals from the GNSS satellites and using the signals to determine location coordinates for the device. The location coordinates can be provided to map applications or other applications executing on the smart phone that can make use of the user's geographic location.

Each of these communication interfaces requires hardware resources, such as an antenna, associated circuitry to support the antenna (e.g., modulators, demodulators, amplifiers), and processing logic (e.g., encoders, decoders, etc.), to generate signals and/or interpret received signals.

SUMMARY

To reduce device size and cost, makers of smart phones and other user devices may implement communication interfaces using shared hardware resources. For instance, an antenna and associated supporting circuitry may be used to provide a cellular voice transceiver, a GNSS receiver, a Wi-Fi transceiver, and a Bluetooth transceiver; other combinations are also possible. Where multiple communication interfaces are implemented using shared resources, the shared resources may need to be allocated among the interfaces.

For example, some user devices may implement a cellular communication module and a GNSS communication module using shared resources. The user device may provide control logic to allocate shared resources such that while a phone call is in progress, the cellular voice communication module receives preferential access to the shared resources, which may cause a degradation in location accuracy; when a phone call is not in progress, more of the shared resources may be reallocated to the GNSS communication module to improve location accuracy.

Coarse decision logic of this kind may provide less than optimal results in at least some situations. For instance, if the user is making an emergency call (e.g., a call to "911" or other emergency dispatch service), it may be desirable to provide the user (or the emergency dispatch service) with high-quality location information, so that emergency personnel can be reliably directed to the user's location. Further, the quality of received GNSS signals may be dependent on where the user is, which may affect the resource needs for processing GNSS signals. For example, in dense urban areas, tall buildings may interfere with reception of GNSS signals, while areas with open skies may be free of interference, with the result that more resources are needed to obtain a quality position fix in urban areas than in open-sky areas.

Accordingly, certain embodiments of the present invention relate to resource allocation logic that can be implemented in a user device (e.g., smart phone, tablet, wearable devices, or other devices with the relevant combination of communication interfaces) to determine resource allocation among different communication modules in a context-dependent manner. For example, the user device may have a communication interface that is shared between a cellular voice communication module and a GNSS communication module. The communication interface may have a set of predefined operating states corresponding to different resource allocations. For instance, there may be a "GNSS-preferred" operating state in which more of the shared resources are allocated to a GNSS communication module (and less to a cellular communication module) and a "cellular-preferred" operating state in which more of the shared resources are allocated toward the cellular communication module (and less to the GNSS communication module). The resource allocation logic may implement an algorithm to select one of the operating states for the communication interface based on context information related to current activity of the user device. Examples of context information may include: GNSS context information (e.g., whether the current location corresponds to an urban area, area of dense foliage, or open sky; current GNSS signal quality metrics); whether a cellular call is in progress and what type of call (e.g., emergency call versus other call); quality of cellular signal reception; which cellular band is currently in use; whether other cellular bands are available; and so on.

In some embodiments, the resource allocation logic may be configured such that when a cellular phone call is initiated (placed or received), the cellular-preferred operating state is initially selected. If the call is determined to be an emergency call (or other special category of call), the resource allocation logic may analyze the GNSS signal quality and available cellular band(s) to determine whether to switch from the cellular-preferred operating state to the GNSS-preferred operating state. Switching to the GNSS-preferred operating state during a call (assuming it can be done without compromising call quality) may allow the user device to provide more accurate location information during the call, e.g., to emergency responders. When a call is not in progress, the resource allocation logic can use location context information and GNSS signal quality information to determine whether to switch to the GNSS-preferred state, which may conserve battery power as compared to a policy of always switching to the GNSS-preferred state when a call is not in progress.

Similarly, the user device may have a communication interface that is shared between a cellular communication module and a local data communication module, such as a Wi-Fi communication module or a Bluetooth communication module. The communication interface may have a set of predefined operating states corresponding to different resource allocations. For instance, there may be a "WLAN-preferred" operating state in which more of the shared resources are allocated to the Wi-Fi communication module (and less to the cellular communication module) and a "cellular-preferred" operating state in which more of the shared resources are allocated toward the cellular communication module (and less to the Wi-Fi communication module). In addition or instead, there may be a "Bluetooth-preferred" operating state in which more of the shared resources are allocated to the Bluetooth communication module (and less to the cellular communication module). Resource allocation logic can be used to select an operating mode based on the current operating conditions, e.g., whether a call is in progress, the current quality of the cellular and local data signals, and the availability of another operating state that may improve performance of local data communication without degrading cellular call quality.

In instances where the communication interface of the user device is shared among more than two communication modules (e.g., cellular voice, Wi-Fi, Bluetooth, and GNSS communication modules), a set of operating states corresponding to different allocations of resources among the modules may be defined. An operating state can be dynamically selected from the set, based on current conditions or context. For example, the selection can be based on context information such as: whether a call is in progress; type of call (e.g., E911 or other); location of the device (e.g., indoors, various outdoor environments); quality of service metrics for various communication services; current usage (e.g., allocating fewer resources to idle communication services); power consumption (e.g., favoring operating states that consume less power); and so on. In some embodiments, based on the current operating context, a prioritization can be established among communication modules (or signal types, where different signal types are associated with different communication modules), and the resource allocation, or operating state, can be based on the prioritization. The user device can reassess its operating context periodically and/or in response to specific events (e.g., initiating or terminating a phone call) and can select a resource allocation, or operating state, according to context-dependent selection rules. The particular sets of operating states and selection rules may depend on the protocols the device supports and/or the types of available context information.

The following detailed description, together with the accompanying drawings, will provide a better understanding of the nature and advantages of the claimed invention.

BRIEF DESCRIPTION OF THE DRAWINGS

FIG. 11 is a table showing examples of RSSI thresholds that can be associated with different WLAN access categories according to an embodiment of the present invention.

FIG. 14 is a table showing examples of RSSI and packet error rate thresholds that can be associated with different Bluetooth link types according to an embodiment of the present invention.

DETAILED DESCRIPTION

Figure 1:
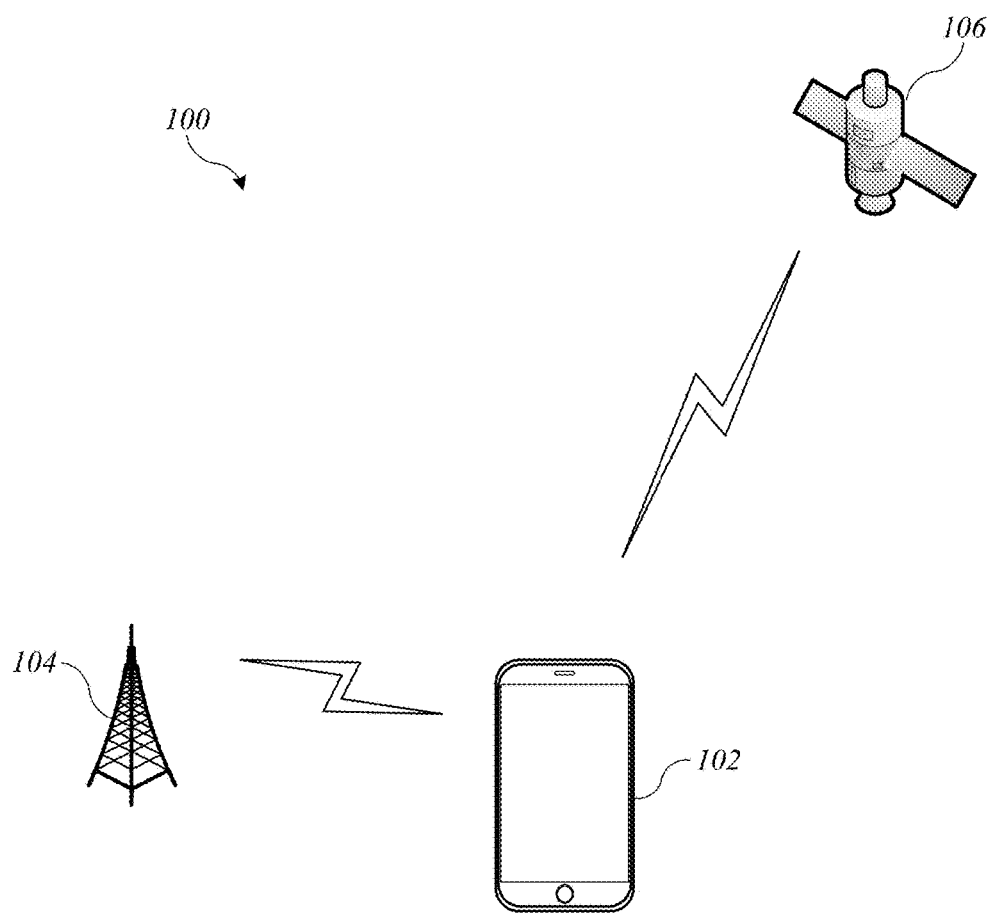
FIG. 1 shows a system suitable for implementing some embodiments of the present invention.

FIG. 1 shows a system 100 suitable for implementing some embodiments of the present invention. System 100 includes a user device 102, which may be, e.g., a smart phone or other mobile phone, tablet computer, wearable device, or any other electronic device that provides communication capability using multiple wireless communication technologies. In this example, user device 102 can communicate wirelessly with a cellular voice network, represented by base station 104, and with a global navigation satellite system (GNSS), represented by satellite 106.

Base station 104 may be part of a network of geographically dispersed base stations (e.g., a cellular voice/data network) that support placing and receiving telephone calls by mobile devices, and user device 102 may engage in two-way communication with base station 104. In some embodiments, base station 104 may support communication in multiple cellular bands (e.g., various UMTS, LTE, and/or GSM bands known and used in the art), and user device 102 may select a band to use based in part on current signal conditions. While cellular voice communication is used as an example herein, it is to be understood that communication with base station 104 may also support two-way data communication using cellular data communication technology.

GNSS satellite 106 may be part of a network of GNSS satellites dispersed in Earth orbit that transmit signals detectable by an appropriately configured GNSS receiver included in user device 102. By analyzing signals received from multiple GNSS satellites 106 (e.g., using conventional techniques), user device 102 can determine its position, which can be measured in standard coordinates (e.g., latitude and longitude). Communication in this case may be unidirectional (from GNSS satellite 106 to user device 102).

In some embodiments, user device 102 may communicate concurrently with cellular base station 104 and GNSS satellite 106. For example, while the user is on a phone call via cellular base station 104, user device 102 may operate a background process to maintain an approximate location fix by periodically listening for and processing signals from various GNSS satellites 106.

In some embodiments, user device 102 may use the same physical resources (e.g., processors, antennas and supporting circuitry, battery, etc.) to support communication with both cellular base station 104 and GNSS satellite 106. Where this is the case, it may be desirable to optimize the allocation of resources (e.g., listening time, processing power, etc.). For instance, in situations where cellular signals from base station 104 are strong, it may be possible to divert resources from cellular communication to GNSS communication, thereby enabling a more reliable position fix without compromising the user experience in regard to the quality of the voice communication. This may be useful, for instance, in situations where the user or user device 102 needs to know the current location during a call (e.g., in order to provide a location to paramedics or other emergency responders).

Accordingly, some embodiments of the present invention provide resource allocation logic for a shared communication interface in a user device such as user device 102. The resource allocation logic can gather operating context information about the current location and activity of the user device. Examples of operating context information include: expected GNSS signal quality based on current location (e.g., dense urban environment, obstructing foliage, clear sky); measured GNSS signal quality; whether a cellular call is in progress; type of call (e.g., emergency call or other call); quality of the cellular signal; availability of other cellular bands; and so on. Based on this information, the resource allocation logic can select an operating state, or resource allocation, for the shared communication interface. In some embodiments, a number of operating states can be defined, with each state corresponding to a different allocation of the shared resources of the shared communication interface. For instance, there may be a "GNSS-favored" operating state, in which shared resources are allocated to optimize the GNSS position accuracy (with possible degradation of cellular signal quality), and a "cell-favored" operating state, in which shared resources are preferentially allocated to optimize the cellular signal quality (with possible degradation in GNSS position accuracy). Other operating states may also be defined, depending on the number and nature of communication signal types that leverage shared resources.

Figure 2:
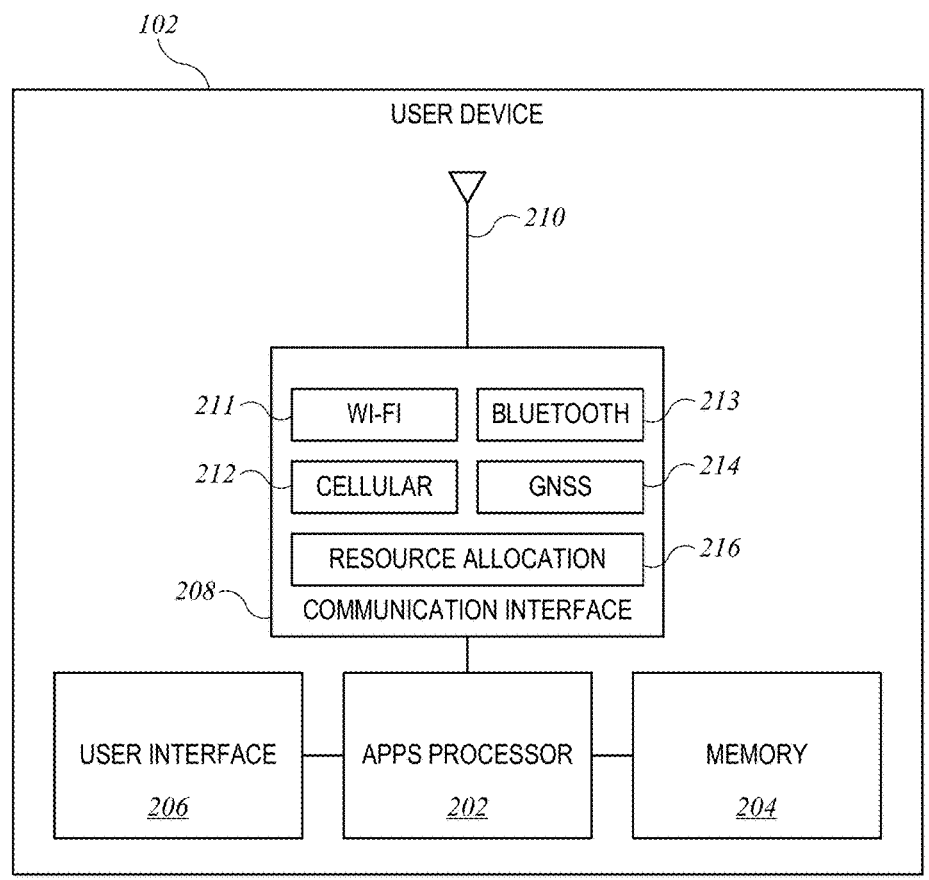
FIG. 2 shows a simplified block diagram of user device according to an embodiment of the present invention.

FIG. 2 shows a simplified block diagram of user device 102 according to an embodiment of the present invention. User device 102 can include an applications (apps) processor 202, a memory 204, a user interface 206, and a communication interface 208. Apps processor 202 can be the main processing unit of user device 102 and can be implemented using one or more single-core or multi-core processor chips. Apps processor 202 can execute software, including an operating system and various application programs that implement user device functionality, such as programs providing maps or other location-aware features and programs allowing the user to place and/or receive cellular phone calls. Memory 204 can include one or more memory devices (e.g., flash memory, DRAM, SRAM, ROM, magnetic storage device, optical storage device, etc.). Memory 204 can be used to store data and program code for use by apps processor 202 and/or other system processors. User interface 206 can include various input devices (e.g., keypad, buttons, knobs, touchpad, microphone, etc.), output devices (e.g., display, speakers, haptic elements), and/or combined input/output devices (e.g., touchscreen display), allowing a user to interact with user device 102. Conventional or other processors, memory devices, and/or user interface components may be used.

Communication interface 208 may include one or more antennas 210 along with supporting circuitry (e.g., modulators, demodulators, amplifiers, etc.) to provide a physical communication layer. Communication interface 208 may also include communication modules to support communication using various wireless communication protocols and technologies (also referred to as "signal types"), and communications may be one-way or two-way, depending on the particular protocol or technology. Examples of communication modules include: Wi-Fi communication module 211 (which may support local-area network communication using IEEE 802.11 family standards); cellular communication module 212 (which may support cellular voice and/or data communication using various cellular bands such as LTE, GSM, UMTS, and the like); Bluetooth communication module 213 (which may support short-range communication using Bluetooth® communication protocols and standards promulgated by the Bluetooth SIG); and GNSS communication module 214 (which may support communication with a global navigation satellite system for location determination). Any number and combination of communication modules may be supported. Each communication module 211-214 may be implemented using a combination of software and hardware. For instance, antenna 210, which may be implemented using a single antenna or an antenna array, may be used to receive a signal, after which a processor within communication interface 208 may execute software-implemented signal-processing algorithms to extract the information content from the signal, with the particular signal-processing algorithms being dependent on the signal type. Any signal-processing algorithms appropriate to the relevant signal type, including conventional algorithms, may be used. In some embodiments, cellular communication module 212 and GNSS communication module 214 share at least some physical resources. For instance, both modules may use the same physical antenna 210 and/or the same signal processor (which may execute different code when processing signals for different protocols). Physical resources may also be shared with other communication modules, such as Wi-Fi communication module 211 and/or Bluetooth communication module 213.

Resource allocation logic module 216 can implement logic to dynamically determine an allocation of the shared resources of communication interface 208. For example, resource allocation logic module 216 can be implemented using a processor (which may be apps processor 202, a signal processor dedicated to communication interface 208, or another processor) executing appropriate program code to implement resource allocation logic. The allocation of shared resources may include, e.g., listening periods on antenna 210, processing cycles on a shared signal processor, etc. In some embodiments, a set of operating states can be defined, with each state corresponding to a different allocation of the shared resources of communication interface 208, and resource allocation logic module 216 can select an operating state from the defined set. For instance, the set may include a "GNSS-favored" operating state, in which shared resources are allocated to optimize the GNSS position accuracy (with possible degradation of cellular signal quality), and a "cell-favored" operating state, in which shared resources are preferentially allocated to optimize the cellular signal quality (with possible degradation in GNSS position accuracy); other states, such as a Wi-Fi favored state and/or a Bluetooth-favored state, may also be included. The particular allocation of resources corresponding to each operating state may depend on the available resources and which resources are shared in a particular implementation.

It will be appreciated that user device 102 is illustrative and that variations and modifications are possible. Any number and combination of communication modules, supporting any number and combination of signal types, may share some or all resources of a communication interface. The communication modules are not limited to the types shown. For instance, in addition to or instead of the types shown, a device may support other signal types, such as 60 GHz or near-field communication signal types. Where a device supports multiple signal types, some resources may be shared while other resources are dedicated to a particular signal type. For instance, a dedicated antenna (or antenna array) may be provided for one of the signal types (or a larger subset of the signal types) while other signal types share an antenna (or antenna array); signal types for which a dedicated antenna (or antenna array) is provided may share other resources, such as signal processors.

Further, a user device may have multiple physically distinct communication interfaces, and different communication interfaces may support different combinations of signal types. To the extent that any communication interface provides physical resources that are shared among two or more signal types, techniques of the kind described herein may be employed. Specific examples of resource allocation techniques will now be described.

Further still, while user device 102 is described with reference to particular blocks, it is to be understood that these blocks are defined for convenience of description and are not intended to imply a particular physical arrangement of component parts, and user device 102 may have additional blocks or components not described herein. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
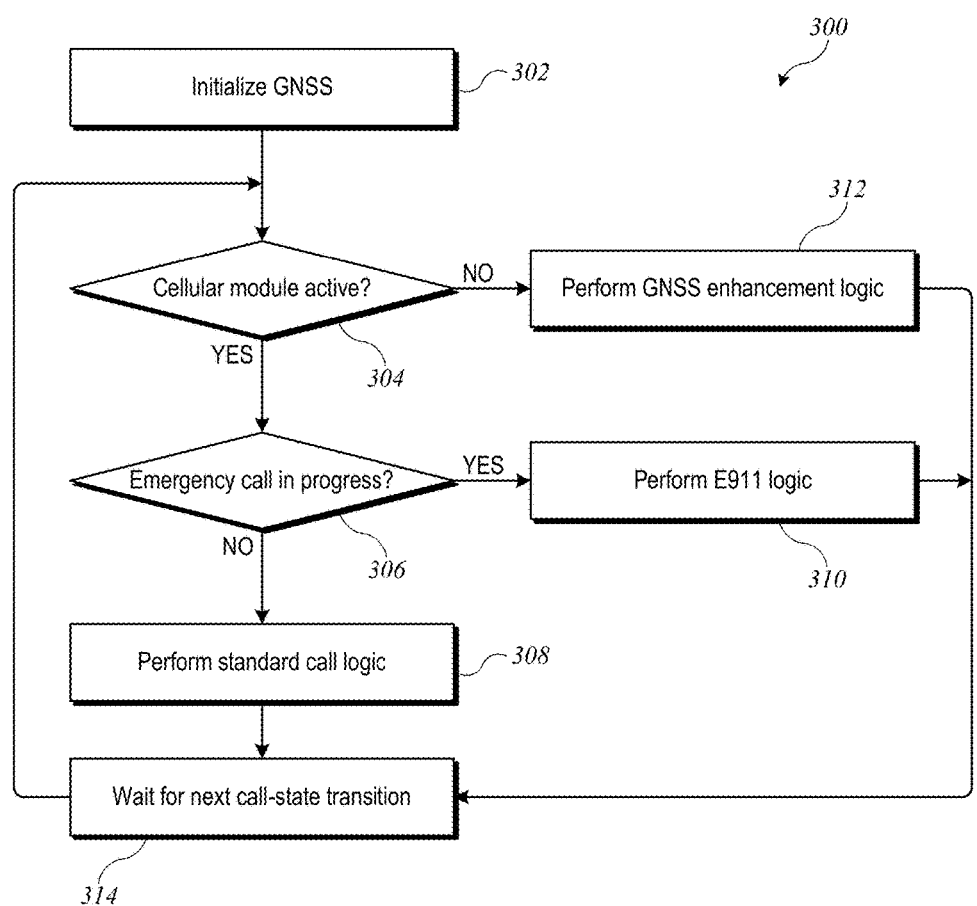
FIG. 3 is a flow diagram showing a high-level view of a state selection process according to an embodiment of the present invention.

FIG. 3 is a flow diagram showing a high-level view of a state selection process 300 that can be implemented in resource allocation logic module 216 according to an embodiment of the present invention in which cellular communication module 212 and GNSS communication module 214 share resources. In this example, resource allocation logic module 216 defaults to the cell-favored operating state, and process 300 may be used to determine whether to switch to the GNSS-favored operating state.

Process 300 can begin at block 302, when GNSS communication module 214 is initialized. This may occur, for instance, during startup of user device 102 or whenever an application program executing on apps processor 202 determines that location information is needed; apps processor 202 can invoke a process that initializes GNSS communication module 214. The initialization procedure may be a standard procedure to establish contact with one or more GNSS satellites and obtain at least a preliminary location estimate that may continue to be updated from time to time while GNSS communication module 214 is active.

At block 304, process 300 can determine whether cellular communication module 212 is also active, e.g., whether a call is in progress. A call can be considered "in progress" from the time the call is placed or received at user device 102 until the call is terminated.

If a call is in progress, then at block 306, process 300 can determine whether the call is an "emergency" call. In some embodiments, an emergency call may be defined as a call placed (or initiated) at user device 102 to an emergency dispatch system such as the "911" system in the U.S., the "112" emergency number supported under the GSM (Global System for Mobile Communication) cellular network standard, or the like. Initiation of an emergency call can be detected by user device 102 based on user input related to placing the call; for instance, the user may be able to invoke an "emergency call" function that automatically places a call to a location-appropriate emergency number, or the user may key in a recognized emergency-call number such as 911 or 112. The emergency call can be considered to be in progress from the time it is initiated until such time as it is terminated (e.g., by the user or the other party).

If a call other than an emergency call is in progress, then at block 308, process 300 can perform a standard call logic algorithm to select an operating state for communication interface 208. In some embodiments, the standard call logic algorithm may simply select or maintain the cell-favored operating state, on the assumption that during a non-emergency call, the user does not need precise location information. Other logic algorithms may be substituted, such as algorithms that may favor Bluetooth or Wi-Fi or other signal types if these signal types can be favored without degrading cellular call quality; examples are described below.

If the call is an emergency call, then at block 310, process 300 can perform an "E911" logic algorithm to select an operating state for communication interface 208. (It should be understood that the use of the term "E911" in this context is not intended to suggest any limitation on the definition of "emergency call.") The E911 logic algorithm can be based on the assumption that in an emergency situation, the user wants to be able to provide the most accurate location information that can be obtained without compromising the ability to communicate on the call with emergency dispatch personnel. Accordingly, the E911 logic algorithm can be designed to increase the resource allocation to GNSS communication module 214 when GNSS communication module 214 would benefit from increased resources and the resulting decrease in resources available to cellular communication module 212 is not expected to cause unacceptable deterioration in the voice communication.

Figure 4:
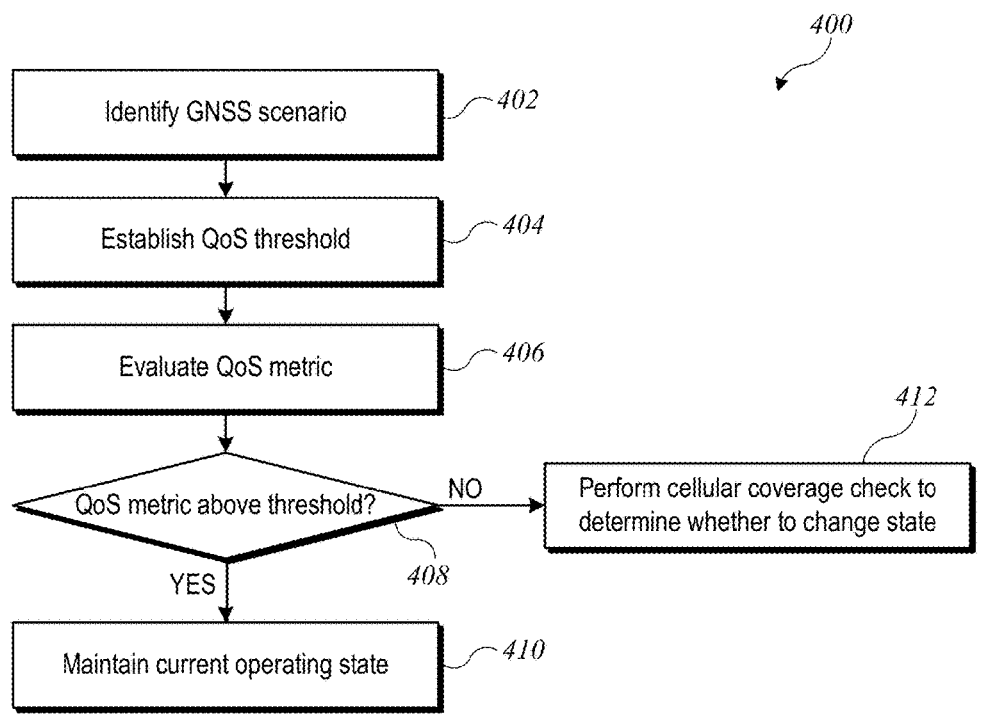
FIG. 4 is a flow diagram showing a logic process according to an embodiment of the present invention.

FIG. 4 is a flow diagram showing an E911 logic process 400 that may be implemented at block 310 of process 300 according to an embodiment of the present invention. At block 402, process 400 can identify a current GNSS "scenario." For example, using the current location estimate (e.g., as obtained at block 302 of process 300), the current location can be categorized according to expected level of GNSS interference. In some embodiments, the following GNSS scenarios can be defined:

"Dense Urban"—Metropolitan city or downtown areas with high-rise buildings that can significantly obstruct GNSS signals, leading to difficulty in obtaining and maintaining a reliable position fix.

"Foliage"—Areas with trees (or other tall plants) that may attenuate GNSS signals, again leading to difficulty in obtaining and maintaining a reliable position fix.

"Open sky"—Areas such as open highways or fields with no significant anticipated obstruction to GNSS signals.

This list of GNSS scenarios is illustrative, and other GNSS scenarios and combinations of GNSS scenarios may also be defined.

Based on observations of actual conditions in particular areas, a lookup table or other data structure may be populated that assigns any given location to one of the GNSS scenarios; population of the data structure can be conducted or managed by human editors. In some embodiments, performance data reported by user devices may be used in populating the data structure. Accordingly, block 402 may include looking up the GNSS scenario from the relevant data structure.

At block 404, a quality of service (QoS) threshold can be established. The QoS threshold can be based on a quality metric that can incorporate real-time information about GNSS performance, such as position error and estimated signal-to-noise ratio in the satellite signal(s). Other information, such as number of GNSS satellites currently visible, and time between position fixes (TBF), may also be incorporated into the quality metric. The QoS threshold may also depend on the identified GNSS scenario. For instance, it may be desirable to set a higher threshold in dense urban areas than in open-sky areas (or vice versa). At block 406, a QoS metric may be determined, and at block 408, a decision can be made as to whether the QoS metric determined at block 406 is above the QoS threshold established at block 404.

If the QoS metric is above the threshold, this may indicate that GNSS communication module 214 is able to provide sufficiently accurate position information without additional resources. Accordingly, at block 410, the current operating state may be maintained. If, however, the QoS metric is not above the threshold, it may be desirable to change the operating state to provide more resources to GNSS communication module 214. At block 412, process 400 can perform a cellular coverage check to determine whether resources can be shifted to GNSS communication module 214 without impairing call quality.

Figure 5:
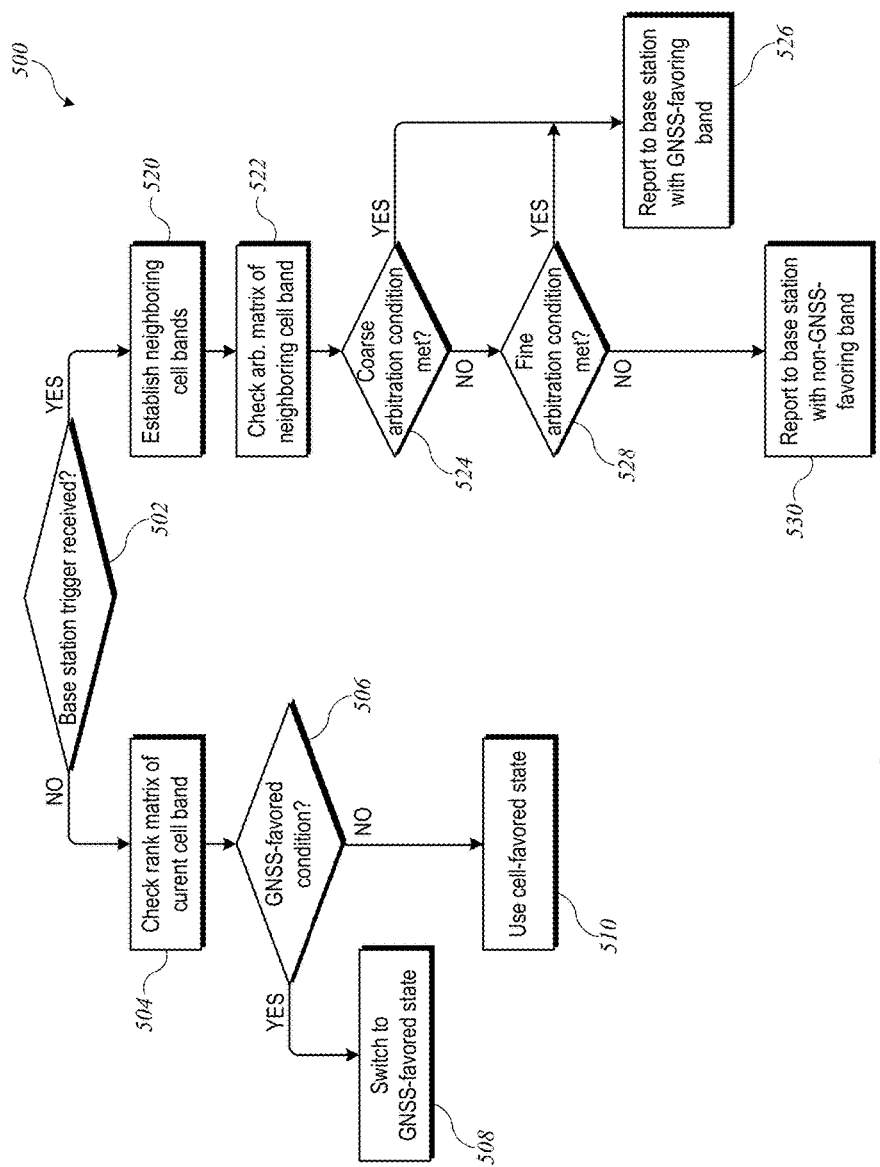
FIG. 5 is a flow diagram showing a cellular coverage check process according to an embodiment of the present invention.

FIG. 5 is a flow diagram showing a cellular coverage check process 500 according to an embodiment of the present invention. Process 500 may be implemented, e.g., at block 412 of process 400. At block 502, process 500 can determine whether a base station trigger has been received. The base station trigger, which may conform to standard cellular networking protocols, may be an indication sent from a first base station 104 that user device 102 should consider performing a handover (or handoff) to a new base station associated with a neighboring cell in the network. Since a given base station may support multiple cellular communication bands, the handover operation can include user device 102 selecting from available bands. User device 102 can respond to the base station trigger by selecting a band and reporting the selection to first base station 104, which can coordinate the handover to the new base station. In process 500, the selection of a band may depend in part on expected GNSS performance.

Figure 6:
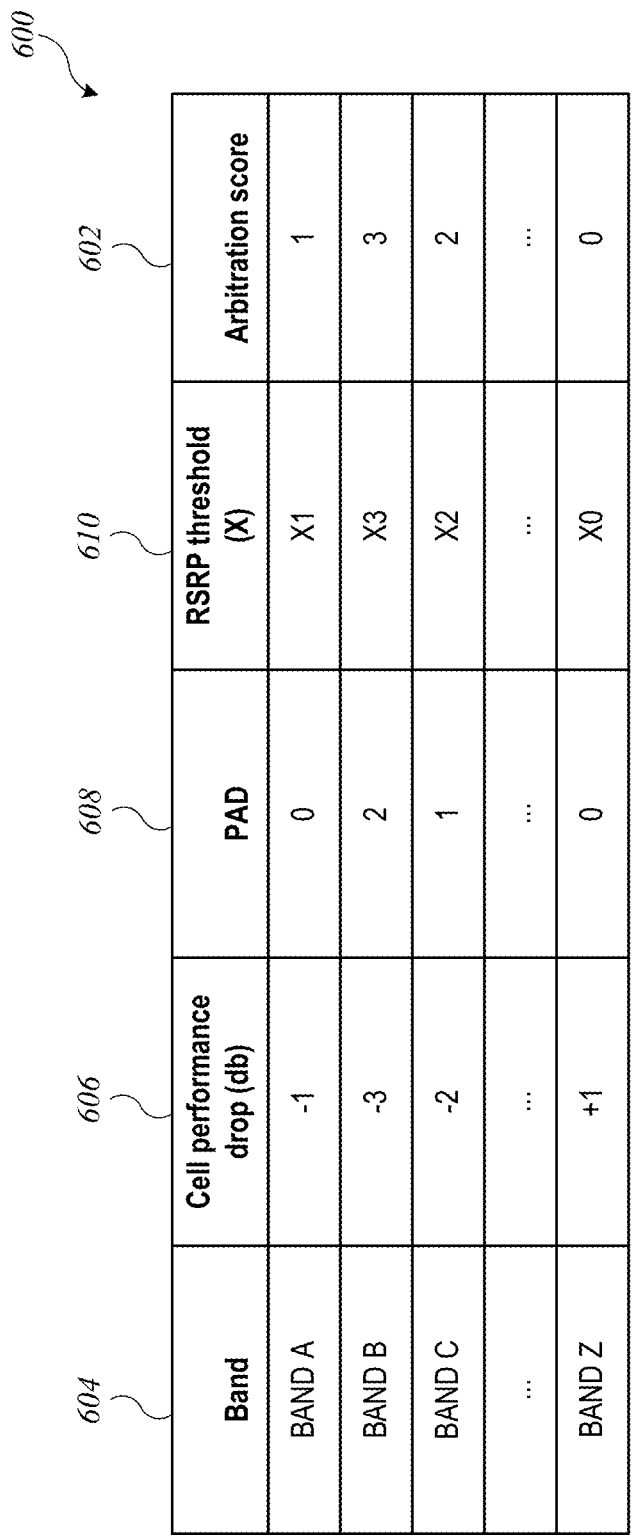
FIG. 6 shows an example of an arbitration matrix according to an embodiment of the present invention.

If a base station trigger has not been received, then at block 504, process 500 can check an arbitration matrix to determine an arbitration score for the current cellular band. FIG. 6 shows an example of an arbitration matrix 600 according to an embodiment of the present invention. Arbitration matrix 600 can assign an arbitration score (column 602) to each cellular communication band (column 604) that is supported by cellular communication module 212. For purposes of illustration, four bands are shown, but it should be understood that any number and combination of bands may be supported, including any combination of GSM, LTE, UMTS, and other standard cellular bands. The arbitration score assigned to a given band can depend in part on information about expected or measured cellular call performance in that band and may also be used as an indicator of whether or under what conditions shared resources can be diverted from cellular communication module 212 when that band is in use. In some embodiments, each band may have various associated metrics, such as cellular performance drop (column 606), a pad value (column 608) that may be used in resource allocation decisions (e.g., as described below), and a reference signal receive power (RSRP) threshold (X) (column 610) that may also be used in resource allocation decisions. Based on these metrics, an arbitration score (column 602) can be assigned to each band; in this example, lower numbers represent preferred (also referred to as "higher" or "better") arbitration scores. In some embodiments, each band has a different arbitration score assigned; other embodiments may allow multiple bands to have the same arbitration score. In some embodiments, there may be some bands that are not included in arbitration matrix 600. Where this is the case, such bands can be assigned a very high arbitration score.

Referring again to FIG. 5, at block 506, a determination can be made as to whether the current band satisfies a GNSS-favored condition. The GNSS-favored condition, which can be defined based in part on arbitration matrix 600, can be used to identify situations in which diverting resources from cellular communication module 212 to GNSS communication module 214 (e.g., by switching to the GNSS-favored operating state) is expected not to degrade cellular call quality. For example, in one embodiment, the GNSS-favored condition can be defined as satisfied if the current measured RSRP exceeds X (where X is the RSRP threshold defined in column 610 of the arbitration matrix) and the arbitration score of the current band is better than 2; otherwise unsatisfied. If the GNSS-favored condition is satisfied, then at block 508, process 500 can switch the operating state of communication interface 208 to the GNSS-favored state (assuming it is not already in the GNSS-favored state). If the GNSS-favored condition is not satisfied, then at block 510, process 500 can maintain the current (cell-favored) operating state.

If, at block 502, a base station trigger is received, then at block 520, process 500 can establish neighboring cellular bands, which can include any or all cellular bands available at the neighboring base station. At block 522, process 500 can check the arbitration matrix (e.g., arbitration matrix 600 of FIG. 6) to determine arbitration information for the neighboring cellular band(s). Based on the arbitration information, a band selection can be made. In process 500, a two-part decision process is used. First, at block 524, a determination can be made as to whether a "coarse" arbitration condition is satisfied by the neighboring cellular band. For instance, in one embodiment, the coarse arbitration condition can be defined as being satisfied if the neighboring cellular band has an arbitration score less than 2. If the coarse arbitration condition is satisfied, then the neighboring cellular band is a GNSS-favoring band, and at block 526, process 500 can report to the base station (e.g., to instigate the handover) with the GNSS-favoring band (i.e., the band that satisfied the coarse arbitration condition). In addition, process 500 can switch the operating state of communication interface 208 to the GNSS-favored state (e.g., after completing the handover).

If, at block 524, the coarse arbitration condition is not satisfied, then at block 528, process 500 can determine whether a "fine" arbitration condition is satisfied. In some embodiments, the fine arbitration requirement can be satisfied by bands whose arbitration score does not satisfy the coarse arbitration conditions if other conditions on cellular signal quality are satisfied. For instance, in one embodiment, the fine arbitration condition can be defined as being satisfied if the band has arbitration score less than 5 and the measured RSRP is greater than the RSRP threshold X (from column 610 of arbitration matrix 600) plus the pad (from column 608 of arbitration matrix 600). If the fine arbitration condition is satisfied, then at block 526, process 500 can report to the base station (e.g., to instigate the handover) with the GNSS-favoring band (i.e., the band that satisfied the fine arbitration condition). In addition, process 500 can switch the operating state of communication interface 208 to the GNSS-favored state (e.g., after completing the handover). If the fine arbitration condition is not satisfied, then at block 530, process 500 can report to the base station (e.g., to instigate the handover) with a non-GNSS-favoring band; in this case, process 500 may leave the operating state in the current (cell-favoring) state.

It should be noted that there may be multiple neighboring cellular bands available. In some embodiments, where multiple neighboring cellular bands are available, process 500 can attempt to determine whether any of the bands satisfies the coarse arbitration condition of block 524; any band that satisfies the coarse arbitration condition (or the highest-scoring band) may be chosen and reported at block 526. If no band satisfies the coarse arbitration condition, then process 500 can attempt to determine whether any of the bands satisfies the fine arbitration condition of block 528; any band that satisfies the fine arbitration condition (or the highest-scoring band that satisfies the condition) may be chosen and reported at block 526. Assuming that a neighboring band that satisfies one of the arbitration conditions of blocks 524 and 526 is available, process 500 can switch to that band and switch the operating state to the GNSS-favored state, allowing improved position determination while preserving call quality. If no neighboring band satisfies either the coarse or fine arbitration condition, then process 500 can result in the operating state remaining in the cell-favored state after a handover. Accordingly, process 500 can have the effect of improving GNSS performance when it is feasible to do so without degrading call quality.

It should be understood that process 500 is illustrative and that variations and modifications are possible. For instance, the coarse and fine arbitration conditions may be modified. In some embodiments, rather than defining multiple arbitration conditions, a single arbitration condition can be established, such as requiring an arbitration score less than 2 and measured RSRP greater than the RSRP threshold X plus the pad. In other embodiments, more than two arbitration conditions may be defined.

Figure 7:
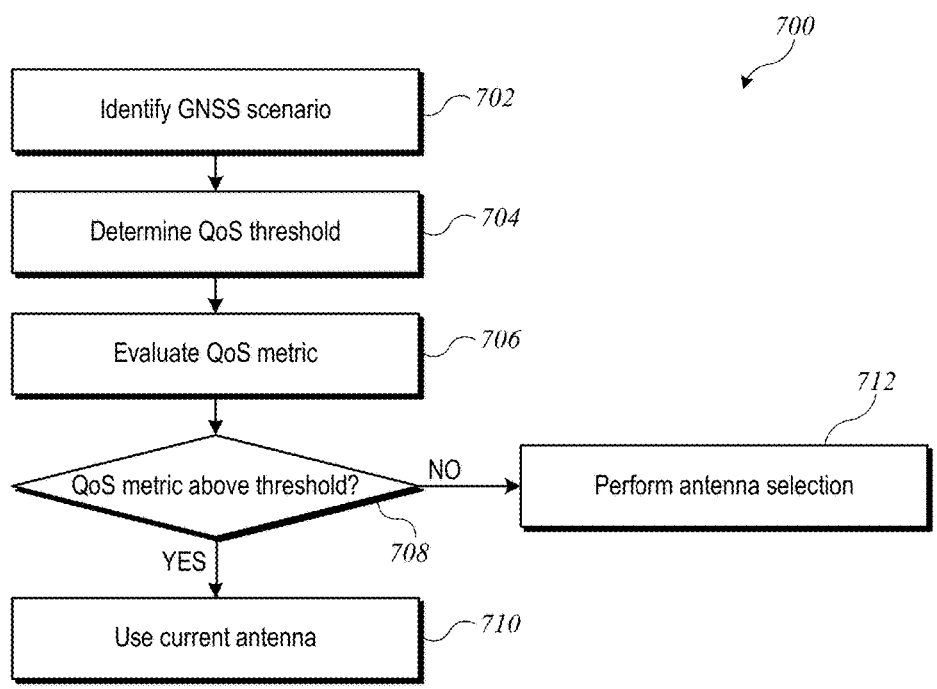
FIG. 7 is a flow diagram showing a logic process according to an embodiment of the present invention that provides antenna diversity.

In some embodiments, user device 102 may have multiple antennas 210 that can be used to receive signals for GNSS communications module 214, a situation sometimes referred to as "antenna diversity." Where this is the case, resource allocation logic module 216 can implement antenna selection logic to select the optimum antenna for GNSS reception, e.g., as part of resource allocation process 300.

Where antenna diversity exists, a process similar to process 400 can be used to determine when to perform antenna selection. FIG. 7 is a flow diagram showing a logic process 700 that may be implemented, e.g., at block 310 of process 300 according to an embodiment of the present invention that provides antenna diversity. At block 702, process 700 can identify a GNSS scenario, similarly to block 302 of process 300. At block 704, a quality of service (QoS) threshold can be established; this may be the same threshold as at block 304 of process 300 or a different threshold that may be defined based on similar considerations. As at block 304, the threshold may depend in part on the identified GNSS scenario. At block 706, a QoS metric for the current antenna may be determined, and at block 708, a decision can be made as to whether the QoS metric determined at block 706 is above the QoS threshold established at block 704.

If the QoS metric is above the threshold, this may indicate that GNSS communication module 214 is able to provide sufficiently accurate position information with the current antenna. Accordingly, at block 710, the current antenna state may be maintained. If, however, the QoS metric is not above the threshold, it may be desirable to select a different antenna. At block 712, process 700 can perform antenna selection logic to select an antenna for receiving GNSS signals.

Figure 8:
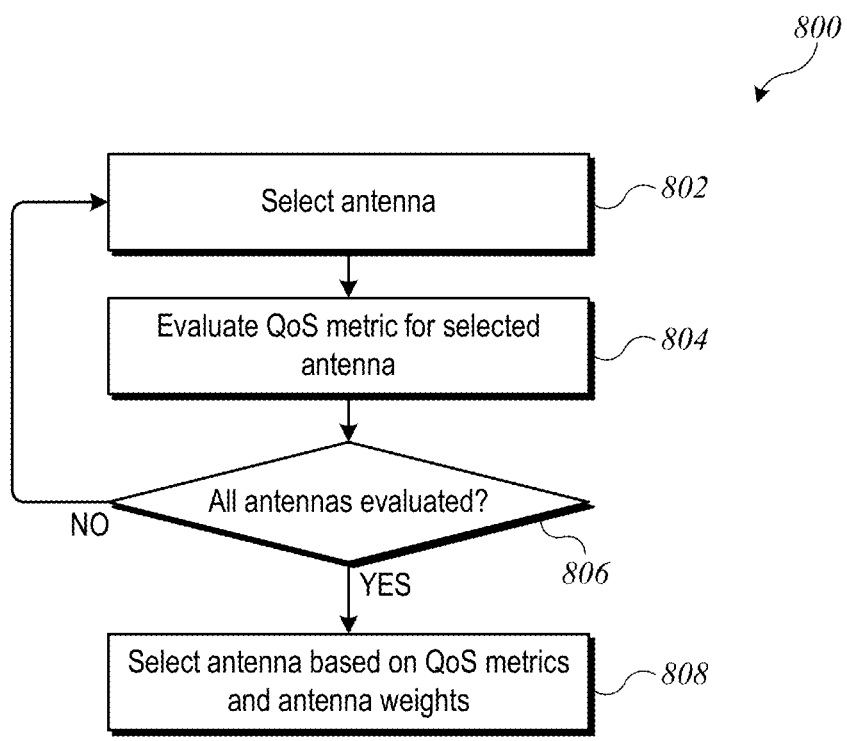
FIG. 8 is a flow diagram showing a logic process for antenna selection according to an embodiment of the present invention.

FIG. 8 is a flow diagram showing a process 800 implementing antenna selection logic according to an embodiment of the present invention. Process 800 may involve comparing quality of service for each available antenna. At block 802, process 800 can select an antenna to evaluate. At block 804, process 800 can evaluate the QoS metric for the selected antenna; this may be the same metric that was defined in process 700. At block 806, process 800 can determine whether to evaluate another antenna and can return to block 802 to select the next antenna to evaluate. Once all available antennas have been evaluated, at block 808, process 800 can select the optimum antenna for GNSS communication module 214 based on the QoS metrics and weights assigned to each antenna. The weights may be used to favor or disfavor particular antennas and may be dynamic or static. For instance, an antenna currently being used for communication in an adjacent band may be disfavored, or antennas that are inherently less reliable for GNSS signals may be disfavored. In some embodiments, the antenna with the best weighted QoS metric is selected.

In some embodiments, antenna diversity may exist in an environment where other resources are shared between GNSS communication module 214 and cellular communication module 212. Where this is the case, processes 400 and 500 may be used concurrently with processes 700 and 800, as the selection of an antenna would not eliminate the potential benefit of selecting a GNSS-favored operating state.

Referring again to FIG. 3, some or all of processes 400, 500, 700 and 800 may be incorporated into the E911 logic performed at block 310. In situations where a call is not in progress ("No" branch at block 304), high call quality may not be a concern. Accordingly, at block 312, process 300 may perform GNSS enhancement logic to determine whether to change the operating state to favor GNSS communication module 214.

In some embodiments, the GNSS enhancement logic may simply change the operating state to the GNSS-favored state whenever a cellular call is not in progress. However, this may result in consuming more power than is needed. Accordingly, some embodiments of the present invention provide context-aware resource allocation logic for situations where a call is not in progress.

Figure 9:
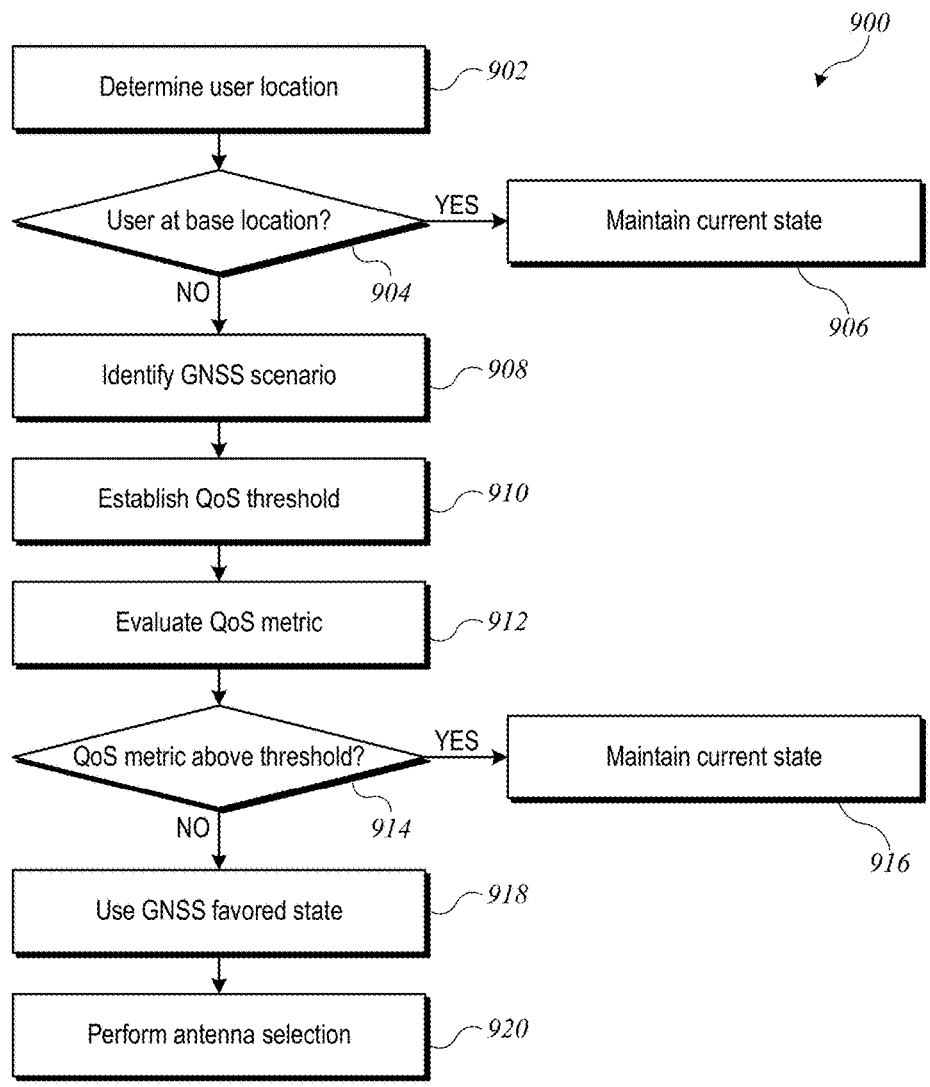
FIG. 9 is a flow diagram showing a logic process according to an embodiment of the present invention.

FIG. 9 is a flow diagram showing a process 900 implementing GNSS enhancement logic according to an embodiment of the present invention. Process 900 can be performed, e.g., by resource allocation logic module 216 at block 312 of process 300.

At block 902, process 900 can determine the user's current location. For example, the determination can be based on currently or recently received GNSS signals. In some embodiments, determining the user's current location can include comparing the location to locations the user is known to frequent. For example, user device 102 may be able to identify a "home" location for the user, a "work" location, and possibly other locations. At block 904, process 900 can determine whether the user is at a "base" location. For purposes of process 900, a base location can include, e.g., the home location, the work location, and/or any other location the user tends to visit regularly and remain at for extended periods. In other embodiments, instead of specific known locations, a base location can include any indoor location.

When the user is at a base location, process 900 may proceed on the assumption that the user will not have an immediate need for a precise location determination or that the precision of a GNSS-based location determination will be inherently limited, as is often the case for indoor locations. Accordingly, at block 906, process 900 can maintain communication interface 208 in the current (cellular-favored) operating state. In some embodiments, this may reduce overall power consumption.

If the user is not at a base location, process 900 may evaluate whether to change the operating state to the GNSS-favored operating state. For example, at block 908, process 900 can identify a GNSS scenario, similarly to block 402 of process 400. In some embodiments, user device 102 may also prompt the user to provide location information (e.g., street address or nearest cross street) to improve the position fix. The prompt may be provided, e.g., as a voice prompt to which the user can reply by speaking and/or as a text or visual prompt to which the user can reply by typing text or touching a location on a displayed map. At block 910, a quality of service (QoS) threshold can be established; this may be the same threshold as at block 404 of process 400 or a different threshold that may be defined based on similar considerations. As at block 404, the threshold may depend in part on the identified GNSS scenario. At block 912, a QoS metric may be determined, and at block 914, a decision can be made as to whether the QoS metric determined at block 912 is above the QoS threshold established at block 910. If the QoS metric is above the threshold, this may indicate that GNSS communication module 214 is able to provide sufficiently accurate position information with the current antenna. Accordingly, at block 916, the current (cell-favored) operating state can be maintained. If, however, the QoS metric is not above the threshold, it may be desirable to improve GNSS performance. Accordingly, at block 918, process 900 can switch communication interface 208 to the GNSS-favored operating state. Additionally or instead, if antenna diversity is present, at block 920, process 900 can perform antenna selection logic; the antenna selection logic can be implemented similarly or identically to process 800 described above.

Referring again to FIG. 3, after a selection of operating state has been made (e.g., using any of the processes described above), process 300 can wait at block 314 for the next call-state transition. A call-state transition may include, e.g., initiating or terminating a call or receiving a base station trigger to initiate a handover to a neighboring cellular band. When a call-state transition occurs, process 300 can return to block 304 to re-evaluate the operating state of communication interface 208 and to change the state if appropriate. In some embodiments, other events may also trigger re-evaluation of the operating state of communication interface 208.

The examples described so far refer to resource allocation between cellular and GNSS communication. Similar logic can be employed in connection with resource allocation between cellular and other communication services, such as Wi-Fi or Bluetooth services. In the case of Wi-Fi or Bluetooth services, enhancing service quality during an E911 call may be of less interest, although it is possible that under some circumstances, these services might provide valuable information to assist emergency responders. (For instance, Wi-Fi or Bluetooth signals may assist in determining a user's location within an indoor environment.)

Figure 10:
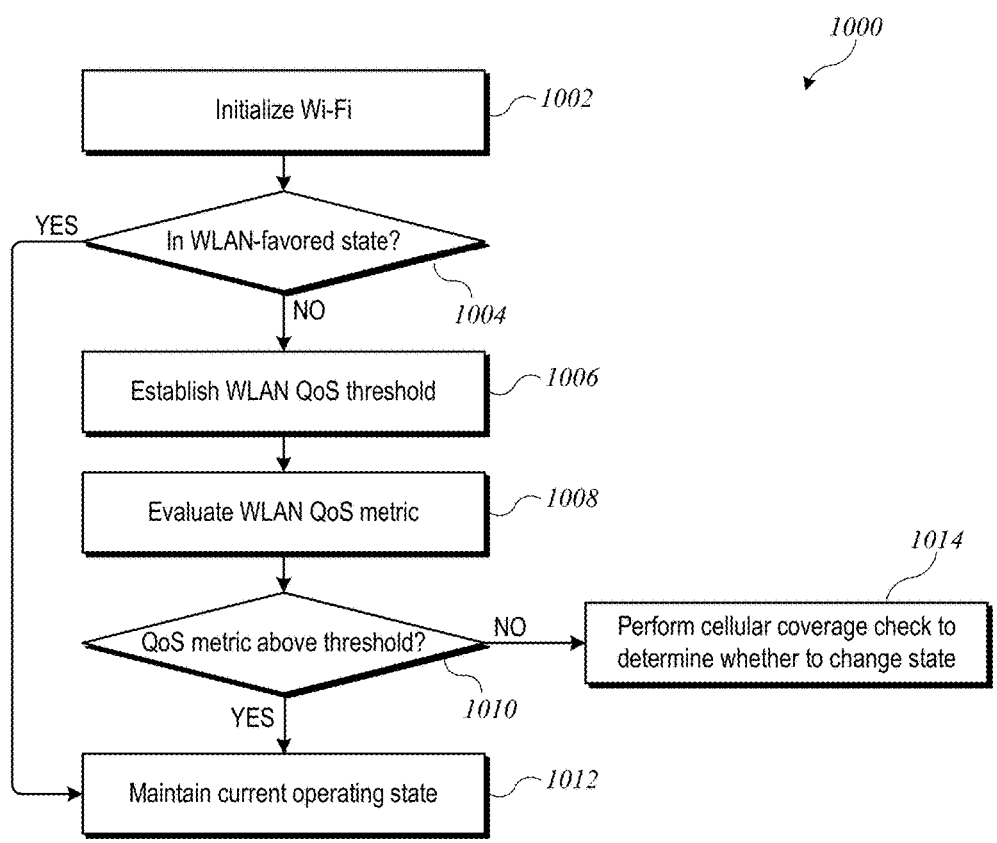
FIG. 10 is a flow diagram showing an operating state selection process that may be implemented according to an embodiment of the present invention

FIG. 10 is a flow diagram showing a resource allocation process 1000 that may be implemented according to an embodiment of the present invention in which a Wi-Fi communications module shares resources with a cellular voice communications module. Process 1000 can be implemented, e.g., in resource allocation logic module 216 of user device 102 of FIG. 2. At block 1002, process 1000 can initialize the Wi-Fi communications module. Initialization may include joining a wireless local area network (WLAN). At block 1004, process 1000 can determine whether the current operating state is a "WLAN-favored state," in which shared resources are allocated to optimize WLAN data communications (with possible degradation of cellular signal quality) or a cell-favored operating state, in which shared resources are preferentially allocated to optimize the cellular signal quality (with possible degradation in WLAN performance, e.g., data throughput). If the current operating state is the WLAN-favored state, the device can remain in that state (block 1012) until some other event occurs. If the current operating state is not the WLAN-favored state, a determination whether to change the operating state can be made.

At block 1006, a WLAN QoS threshold can be established. The WLAN QoS threshold can be based on a quality metric that can incorporate real-time information about WLAN performance, such as the received signal strength, which can be quantified using a standard received signal strength indicator (RSSI) or other techniques. In some embodiments, the WLAN QoS threshold can be a threshold on the RSSI that is selected based on the current WLAN access category, or the type of network access that is underway. For example, WLAN access categories can include voice communication (denoted "VO"), video streaming (denoted "VI"), background operation (denoted "BK"), and best effort (denoted "BE"); those skilled in the art will be familiar with the selection of an access category depending on device activity. FIG. 11 is a table 1100 showing examples of RSSI thresholds (column 1102) that can be associated with different WLAN access categories (column 1104) according to an embodiment of the present invention. It is to be understood that these access categories and associated RSSI thresholds are for purposes of illustration and may be modified as desired.

At block 1008, the WLAN QoS metric may be determined, and at block 1010, a decision can be made as to whether the WLAN QoS metric determined at block 1008 is above the WLAN QoS threshold established at block 1006.

If the WLAN QoS metric is above the threshold, this may indicate that Wi-Fi communication module 211 is able to provide sufficient performance without additional resources. Accordingly, at block 1012, the current operating state may be maintained. If, however, the WLAN QoS metric is not above the threshold, it may be desirable to change the operating state to provide more resources to Wi-Fi communication module 211. At block 1014, process 1000 can perform a cellular coverage check to determine whether resources can be shifted to Wi-Fi communication module 211 without impairing call quality.

Figure 12:
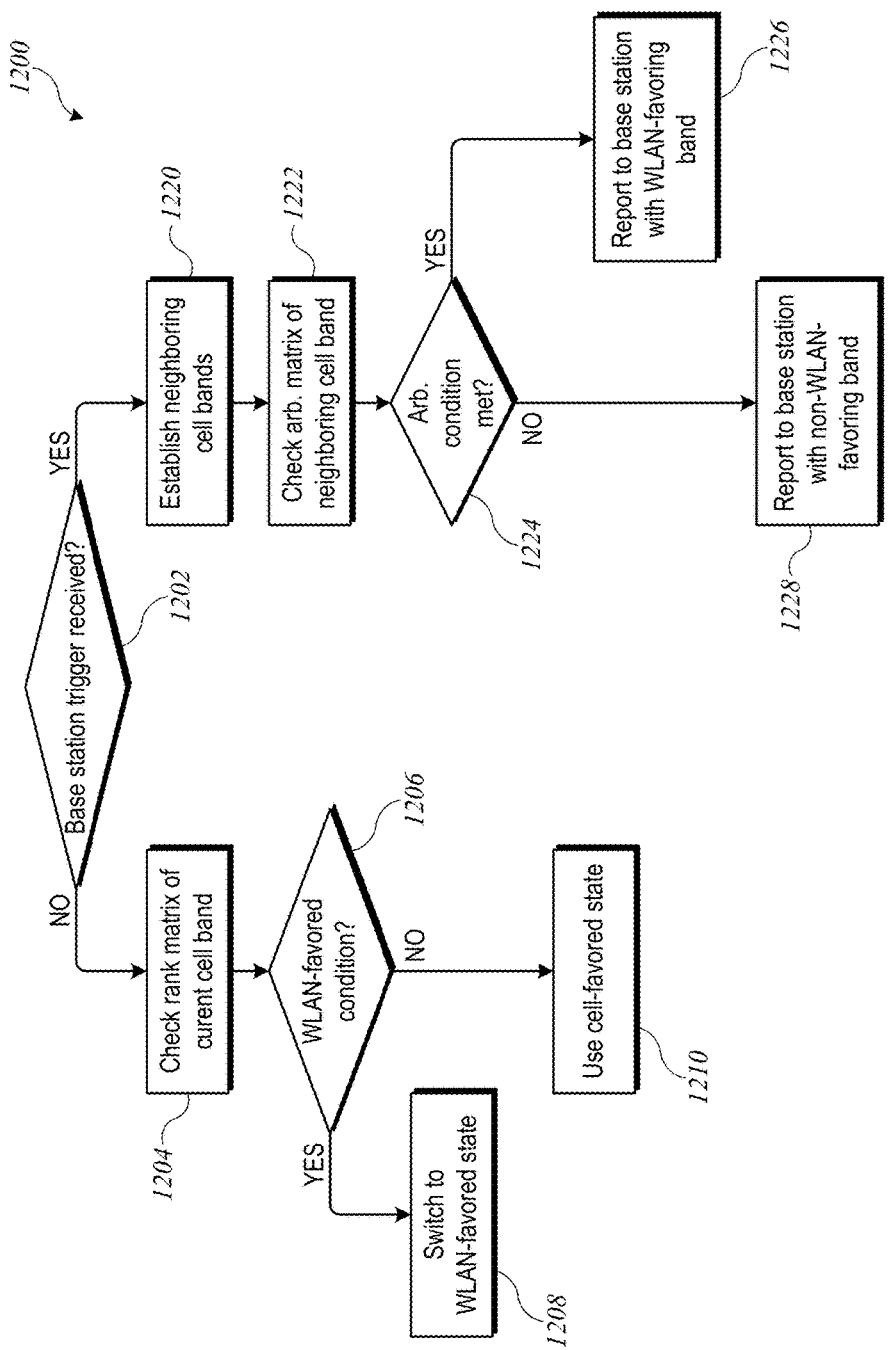
FIG. 12 is a flow diagram showing a cellular coverage check process according to an embodiment of the present invention.

FIG. 12 is a flow diagram showing a cellular coverage check process 1200 according to an embodiment of the present invention. Process 1200 may be implemented, e.g., at block 1014 of process 1000. At block 1202, process 1200 can determine whether a base station trigger has been received. This can be similar to block 502 of process 500 described above. In process 1200, the selection of a band in the event of a base station trigger may depend in part on expected WLAN performance.

If a base station trigger has not been received, then at block 1204, process 1200 can check an arbitration matrix to determine an arbitration score for the current cellular band. The arbitration matrix may be similar or identical to matrix 600 of FIG. 6 and can be used to assign an arbitration score to each cellular communication band that is supported by cellular communication module 212.

At block 1206, a determination can be made as to whether the current band satisfies a WLAN-favored condition. The WLAN-favored condition, which can be defined based in part on arbitration matrix 600, can be used to identify situations in which diverting resources from cellular communication module 212 to Wi-Fi communication module 211 (e.g., by switching to the WLAN-favored operating state) is expected not to degrade cellular call quality. For example, in one embodiment, the WLAN-favored condition can be defined as satisfied if the current measured RSRP exceeds X (where X is the RSRP threshold defined in column 610 of the arbitration matrix) and the arbitration score of the current band is better than 2; otherwise unsatisfied. If the WLAN-favored condition is satisfied, then at block 1208, process 1200 can switch the operating state of communication interface 208 to the WLAN-favored state (assuming it is not already in the WLAN-favored state). If the WLAN-favored condition is not satisfied, then at block 1210, process 1200 can maintain the current (cell-favored) operating state.

If, at block 1202, a base station trigger is received, then at block 1220, process 1200 can establish neighboring cellular bands, which can include any or all cellular bands available at the neighboring base station. At block 1222, process 1200 can check the arbitration matrix (e.g., arbitration matrix 600 of FIG. 6) to determine arbitration information for the neighboring cellular band(s). Based on the arbitration information, a band selection can be made. At block 1224, a determination can be made as to whether an arbitration condition is satisfied by the neighboring cellular band. For instance, in one embodiment, the arbitration condition can be defined as being satisfied if the neighboring cellular band has an arbitration score less than 2 and a measured RSRP greater than the RSRP threshold X (from column 610 of arbitration matrix 600) plus the pad (from column 608 of arbitration matrix 600). If the arbitration condition is satisfied, then the neighboring cellular band is a WLAN-favoring band, and at block 1226, process 1200 can report to the base station (e.g., to instigate the handover) with the WLAN-favoring band (i.e., the band that satisfied the arbitration condition). In addition, process 1200 can switch the operating state of communication interface 208 to the WLAN-favored state (e.g., after completing the handover).

If, at block 1224, the arbitration condition is not satisfied, then at block 1228, process 1200 can report to the base station (e.g., to instigate the handover) with a non-WLAN-favoring band; in this case, process 1200 may leave the operating state in the current (cell-favoring) state.

As with process 500, it should be noted that there may be multiple neighboring cellular bands available. In some embodiments, where multiple neighboring cellular bands are available, process 1200 can attempt to determine whether any of the bands satisfies the arbitration condition of block 1224; any band that satisfies the arbitration condition (or the highest-scoring band) may be chosen and reported at block 1226. If no neighboring band satisfies the arbitration condition, then process 1200 can result in the operating state remaining in the cell-favored state after a handover. Accordingly, process 1200 can have the effect of improving WLAN performance when it is feasible to do so without degrading call quality.

It should be understood that process 1200 is illustrative and that variations and modifications are possible. For instance, the arbitration condition may be modified, and (similarly to process 500) multiple arbitration conditions can be defined.

Figure 13:
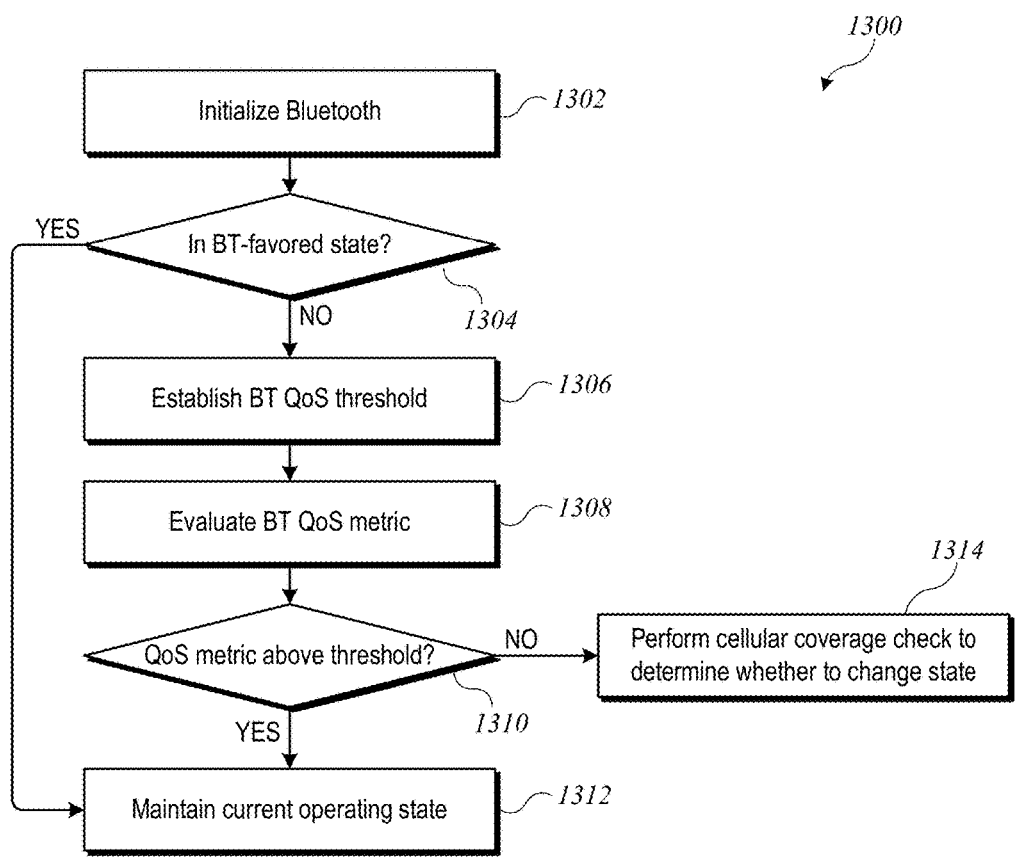
FIG. 13 is a flow diagram showing an operating state selection process that may be implemented according to an embodiment of the present invention

FIG. 13 is a flow diagram showing a resource allocation selection process 1300 that may be implemented according to an embodiment of the present invention in which a Bluetooth communications module shares resources with a cellular voice communications module. Process 1300 can be implemented, e.g., in resource allocation logic module 216 of user device 102 of FIG. 2. At block 1302, process 1300 can initialize the Bluetooth communications module. Initialization may include, e.g., pairing with another Bluetooth device and/or re-establishing a connection with a previously paired device. At block 1304, process 1300 can determine whether the current operating state is a "BT-favored state" (where "BT" represents "Bluetooth") in which shared resources are allocated to optimize Bluetooth data communications (with possible degradation of cellular signal quality) or a cell-favored operating state, in which shared resources are preferentially allocated to optimize the cellular signal quality (with possible degradation in Bluetooth performance, e.g., data throughput). If the current operating state is the BT-favored state, the device can remain in that state (block 1312) until some other event occurs. If the current operating state is not the BT-favored state, a determination whether to change the operating state can be made.

Figure 14:
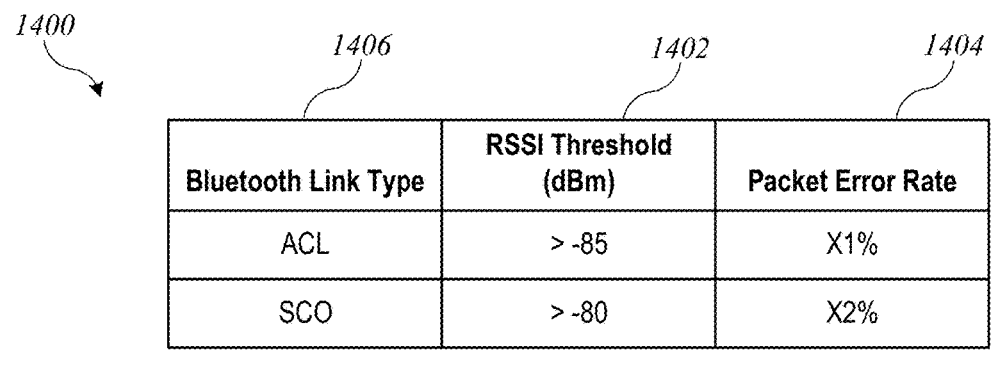

At block 1306, a BT QoS threshold can be established. The BT QoS threshold can be based on a quality metric that can incorporate real-time information about Bluetooth performance, such as the received signal strength (which can be quantified using a standard received signal strength indicator (RSSI) or other techniques), packet error rate, and/or other information. In some embodiments, the BT QoS metric can be based on RSSI and packet error rate, and selection of a threshold can be based on the Bluetooth link type that is currently in use. For example, a Bluetooth link can be classified as an asynchronous (ACL) link (e.g., used for streaming) or a synchronous (SCO) link (e.g., used for voice communication); those skilled in the art will be familiar with the selection of a Bluetooth link type for a particular connection. FIG. 14 is a table 1400 showing examples of RSSI (column 1402) and packet error rate thresholds (column 1404) that can be associated with different Bluetooth link types (column 1406) according to an embodiment of the present invention. It is to be understood that these access categories and associated thresholds are for purposes of illustration and may be modified as desired.

At block 1308, the BT QoS metric may be determined, and at block 1310, a decision can be made as to whether the BT QoS metric determined at block 1308 is above the BT QoS threshold established at block 1306.

If the BT QoS metric is above the threshold, this may indicate that Bluetooth communication module 213 is able to provide sufficient performance without additional resources. Accordingly, at block 1312, the current operating state may be maintained. If, however, the BT QoS metric is not above the threshold, it may be desirable to change the operating state to provide more resources to Bluetooth communication module 213. At block 1314, process 1300 can perform a cellular coverage check to determine whether resources can be shifted to Bluetooth communication module 213 without impairing call quality.

Figure 15:
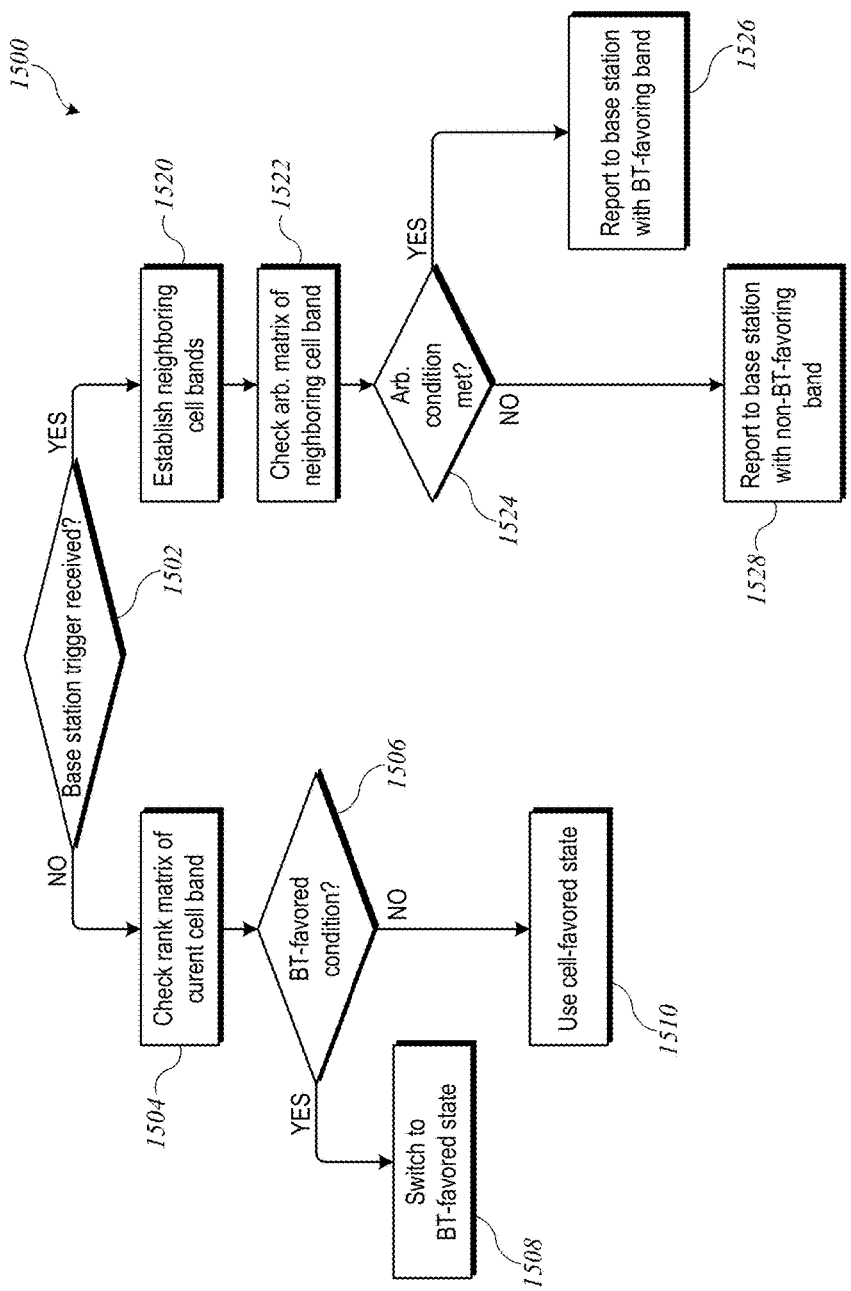
FIG. 15 is a flow diagram showing a cellular coverage check process according to an embodiment of the present invention.

FIG. 15 is a flow diagram showing a cellular coverage check process 1500 according to an embodiment of the present invention. Process 1500 may be implemented, e.g., at block 1314 of process 1300. At block 1502, process 1500 can determine whether a base station trigger has been received. This can be similar to block 502 of process 500 described above. In process 1500, the selection of a band in the event of a base station trigger may depend in part on expected Bluetooth performance.

If a base station trigger has not been received, then at block 1504, process 1500 can check an arbitration matrix to determine an arbitration score for the current cellular band. The arbitration matrix may be similar or identical to matrix 600 of FIG. 6 and can be used to assign an arbitration score to each cellular communication band that is supported by cellular communication module 212.

At block 1506, a determination can be made as to whether the current band satisfies a BT-favored condition. The BT-favored condition, which can be defined based in part on arbitration matrix 600, can be used to identify situations in which diverting resources from cellular communication module 212 to Bluetooth communication module 213 (e.g., by switching to the BT-favored operating state) is expected not to degrade cellular call quality. For example, in one embodiment, the BT-favored condition can be defined as satisfied if the current measured RSRP exceeds X (where X is the RSRP threshold defined in column 610 of the arbitration matrix) and the arbitration score of the current band is better than 2; otherwise unsatisfied. If the BT-favored condition is satisfied, then at block 1508, process 1500 can switch the operating state of communication interface 208 to the BT-favored state (assuming it is not already in the BT-favored state). If the BT-favored condition is not satisfied, then at block 1510, process 1500 can maintain the current (cell-favored) operating state.

If, at block 1502, a base station trigger is received, then at block 1520, process 1500 can establish neighboring cellular bands, which can include any or all cellular bands available at the neighboring base station. At block 1522, process 1500 can check the arbitration matrix (e.g., arbitration matrix 600 of FIG. 6) to determine arbitration information for the neighboring cellular band(s). Based on the arbitration information, a band selection can be made. At block 1524, a determination can be made as to whether an arbitration condition is satisfied by the neighboring cellular band. For instance, in one embodiment, the arbitration condition can be defined as being satisfied if the neighboring cellular band has an arbitration score less than 2 and a measured RSRP greater than the RSRP threshold X (from column 610 of arbitration matrix 600) plus the pad (from column 608 of arbitration matrix 600). If the arbitration condition is satisfied, then the neighboring cellular band is a BT-favoring band, and at block 1526, process 1500 can report to the base station (e.g., to instigate the handover) with the BT-favoring band (i.e., the band that satisfied the arbitration condition). In addition, process 1500 can switch the operating state of communication interface 208 to the BT-favored state (e.g., after completing the handover).

If, at block 1524, the arbitration condition is not satisfied, then at block 1528, process 500 can report to the base station (e.g., to instigate the handover) with a non-BT-favoring band; in this case, process 1500 may leave the operating state in the current (cell-favoring) state.

As with processes 500 and 1200 described above, it should be noted that there may be multiple neighboring cellular bands available. In some embodiments, where multiple neighboring cellular bands are available, process 1500 can attempt to determine whether any of the bands satisfies the arbitration condition of block 1524; any band that satisfies the arbitration condition (or the highest-scoring band) may be chosen and reported at block 1526. If no neighboring band satisfies the arbitration condition, then process 1500 can result in the operating state remaining in the cell-favored state after a handover. Accordingly, process 1500 can have the effect of improving Bluetooth performance when it is feasible to do so without degrading call quality.

It should be understood that process 1500 is illustrative and that variations and modifications are possible. For instance, the arbitration condition may be modified, and (similarly to process 500) multiple arbitration conditions can be defined. Further, while the arbitration conditions used in process 1500 (for Bluetooth/cellular resource sharing) and process 1200 (for Wi-Fi/cellular resource sharing) are the same in these examples, it should be understood that different arbitration conditions may be applied for different communication modules.

The preceding examples relate to resource allocation between two communication services (e.g., cellular and another service); however, similar techniques may be applied in situations where a communication interface provides shared resources to support multiple communication standards and protocols, such as a combination of cellular, Wi-Fi, Bluetooth, and GNSS services.

Figure 16:
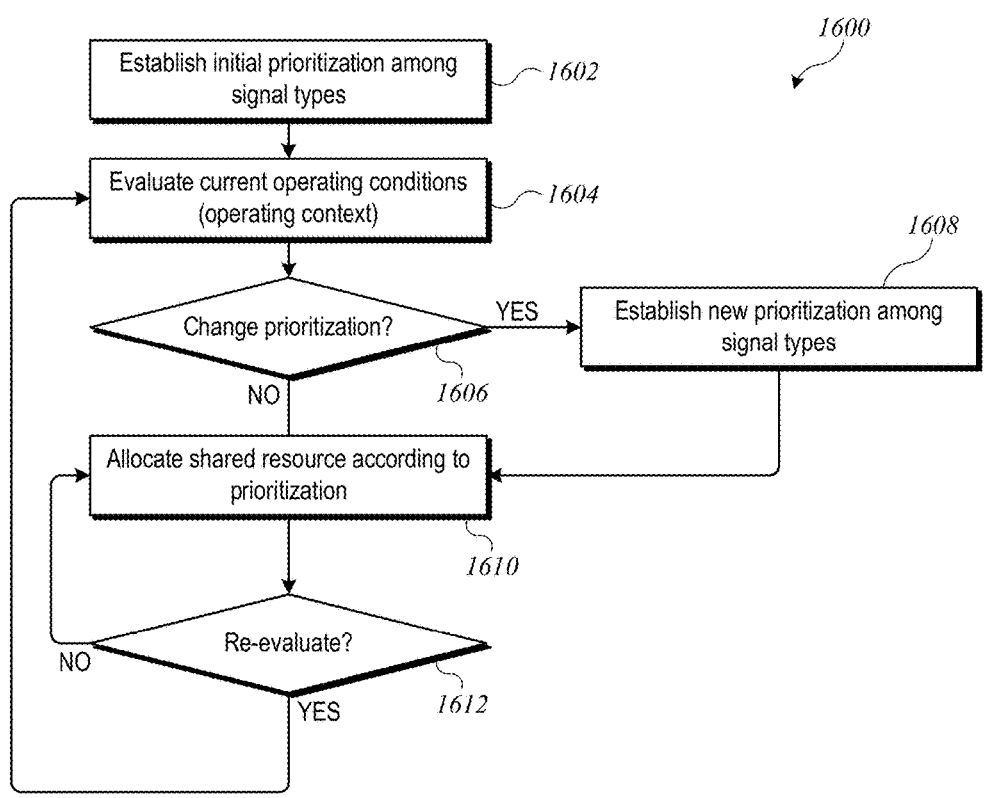
FIG. 16 is a flow diagram showing an operating state selection process that may be implemented according to an embodiment of the present invention

FIG. 16 is a flow diagram of a process 1600 showing a resource allocation process 1600 that may be implemented according to an embodiment of the present invention where two or more communication modules are implemented using shared resources as described above. Process 1600 can be implemented, e.g., in resource allocation logic module 216 of user device 102 of FIG. 2. In process 1600, based on a current operating context, a prioritization can be established among the communication modules (or signal types) that access a shared resource. For example, at any given time, one signal type may be assigned a highest priority, and another signal type may be assigned a second highest priority; additional signal types can be assigned lower priorities. Based on the prioritization, the shared resource can be allocated among the different signal types. For instance, the allocation can be such as to maximize the signal quality or performance for the signal type having highest priority, subject to the constraint that the signal quality or performance of the signal type having second-highest priority does not fall below a minimum acceptable threshold.

Process 1600 can begin at block 1602 when an initial prioritization among signal types (or communication modules) is established. For example, during initialization of user device 102 of FIG. 2, the various communications modules 211-214 may be initialized in their idle states. In some embodiments, device initialization may include some or all of modules 211-214 establishing connections; for instance, Wi-Fi communications module 211 may join a WLAN during initialization if a known network is available. GNSS module 214 may be activated to establish an initial location estimate for user device 102. The initial prioritization among signal types can support these operations.

Once initialization is complete, at block 1604, process 1600 can evaluate the current operating context of user device 102. For example, process 1600 can determine whether a cellular call is in progress, whether any Bluetooth devices are connected, whether the user device is connected to a WLAN, what the current GNSS scenario is, etc. Based on the current operating context, at block 1606, process 1600 can determine whether to change the prioritization of the signal types; if the prioritization is to be changed, then at block 1608, the new prioritization of signal types is established. At block 1610, the shared resource can be allocated according to the prioritization. For example, the shared resource can be allocated to maximize the signal quality or performance for the signal type having highest priority, subject to the constraint that the signal quality or performance of the signal type having second-highest priority does not fall below a minimum acceptable threshold. As another example, the shared resource can be allocated to maximize the signal quality or performance for the signal type having highest priority, subject to the constraint that the signal quality or performance of any other signal type does not fall below a minimum acceptable threshold.

At block 1612, process 1600 can determine whether the prioritization should be re-evaluated. For instance, re-evaluation may occur in response to various events that can be detected by user device 102. Examples of events that may trigger re-evaluation at block 1612 may include any or all of: a communication module transitioning from idle to active state (or vice versa); user device 102 changing location (e.g., as determined from GNSS signal quality changes and/or motion detectors within user device 102); and/or changes in received signal strength at any of the communication modules.

Process 1600 allows a variety of different resource allocations to be established at different times using a set of selection criteria based on elements of the operating context. A particular resource allocation can assign priority to each communication module. For example, communications modules that are in active use may be prioritized over modules that are idle. Thus, in one instance, if a cellular call is in progress (cellular communication module 212 active) but no Bluetooth device is connected (Bluetooth communication module 213 inactive), cellular communication module 212 can be prioritized over Bluetooth communication module 213. Similarly, if user device 102 is not connected to a Wi-Fi network during a call, then Wi-Fi communication module 211 can be deprioritized when a call is in progress. Prioritization of GNSS communication module 214 during a cellular call may be handled in the manner described above, with GNSS communication module 214 receiving higher priority when possible during an emergency call and a lower priority during other calls.

When a call is not in progress, cellular communication module 212 may enter an inactive state and may receive low priority, and priority of one or more modules that are in the active state may be increased. For example, if user device 102 is in an indoor location, Wi-Fi communication module 211 may be prioritized, while GNSS communication module 214 is prioritized when user device 102 is outdoors. In another example, where two or more modules are in active states, the signal quality (e.g., RSSI or RSRP) of the various modules may be compared, and the module with poorest signal quality may be prioritized over another module with better signal quality. In some embodiments, self-interference may be detected at a module, and a module that is experiencing self-interference can be prioritized over a module that is not. In the case of GNSS communication module 214, the GNSS scenario may be used as a proxy for signal quality, and GNSS communication module 214 may receive higher priority in challenging scenarios (e.g., in dense urban environments) in order to improve the location estimate. Similarly, if two or more modules are active and one is experiencing particularly strong signal quality (e.g., cellular RSRP is above a threshold), the module with strong signal quality may receive a lower priority. In yet another example, different modules may require different amounts of power for antenna 210, and prioritization may include favoring a lower-power module over a higher-power module.

In some embodiments, the prioritization of signal types can be used to control resource allocation in a manner that balances the requirements of two (or more) signal types. For example, as described above, when an emergency call is in progress, GNSS communication module 214 may be assigned the highest priority and cellular communication module 212 may be assigned the second highest priority. The resource allocation logic can be configured to maximize the quality of the GNSS signal subject to the constraint that cellular signal quality does not fall below a minimum threshold; an example of suitable logic is described above with reference to FIGS. 4-6. When an non-emergency call is in progress, another module (e.g., Bluetooth module 213) may be assigned highest priority and cellular voice communication module 212 may be assigned second highest priority. The resource allocation logic can be configured to maximize the quality of the Bluetooth (or other highest-priority) signal subject to the constraint that cellular signal quality does not fall below a minimum threshold; an example of suitable logic is described above with reference to FIGS. 13-15.

Figure 17:
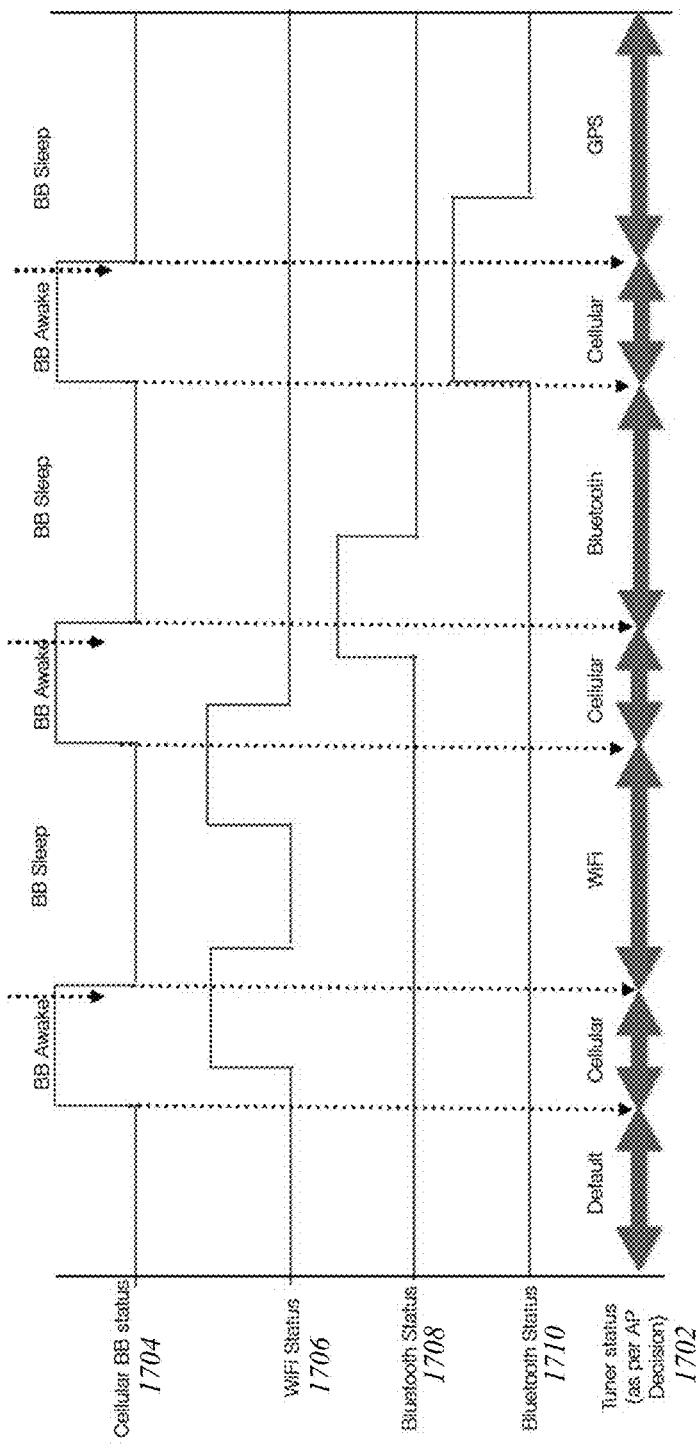
FIG. 17 shows an example of time allocations for an antenna according to an embodiment of the present invention.

Resources can be allocated to various modules 211-214 based on their prioritization. Any shared resource may be allocated in this manner. One example of a shared resource may be antenna 210. In some embodiments, antenna 210 and its supporting RF circuitry may be tuned for receiving different types of signals (e.g., cellular, GNSS, Wi-Fi, Bluetooth) at different times. FIG. 17 shows an example of time allocations for antenna 210 according to an embodiment of the present invention. Timeline 1702 shows the tuner status; the labels indicate the signal type for which antenna 210 is tuned at any given time. Also shown are status timelines for example cellular signals (timeline 1704), Wi-Fi signals (timeline 1706), and two different Bluetooth device signals (timelines 1708, 1710). The status timelines are shown as binary signals with a high value indicating active/awake state and a low value indicating inactive/sleep state. In this example, tuner status at timeline 1702 is controlled such that antenna 210 is tuned for cellular whenever the cellular signal (timeline 1704) is in the awake state. During the time intervals when the cellular signal is in the sleep state, antenna 210 can be tuned for other signal types, and the selection of a particular signal type may depend on prioritization as described above.

It will be appreciated that similar timing considerations can be applied in other contexts. For example, when user device 102 is not connected to a WLAN, Wi-Fi communication module 211 may periodically wake up and perform a scan to detect available networks and may automatically join a network if a known network is found. During the scan intervals, antenna 210 may be tuned for Wi-Fi; between scan intervals, antenna 210 may be tuned for other signals.

Similarly, when user device 102 is connected to a WLAN but is not actively using the network, Wi-Fi communication module 211 may enter a power-saving mode where it periodically wakes up to listen for a beacon signal. Antenna 210 may be tuned for Wi-Fi during the listening interval, and at other times antenna 210 may be tuned for other signals. The particular choice of signals may depend on the current prioritization among the non-Wi-Fi communication modules. Prioritization of Bluetooth may be handled similarly.

While the invention has been described with reference to specific embodiments, those skilled in the art with access to this disclosure will appreciate that variations and modifications are possible. For example, the E911 logic described above can be also used in connection with other types of calls where the user may desire reliable location information, and whether to apply the E911 logic during a particular call can be based on context information for the call, such as whether the user is at home, another base location, or somewhere else; information about a number being called (e.g., delivery or transportation services that may need to know the user's exact location); whether the user accesses a maps application program on the user device during a call; or the like. Similar logic may also be applied, e.g., to determine priority to be given to other communication services such as Wi-Fi and/or Bluetooth. For instance, if the user is on a call using a Bluetooth headset, it may be desirable to prioritize Bluetooth communication to the extent the cellular signal quality permits.

In addition, some of the embodiments described above provide two operating states, or resource allocations, for the communication interface, but additional operating states may also be defined. By way of illustration, in some embodiments where communication resources are shared between cellular and GNSS signals, different operating states may be associated with different cellular bands, and each band-specific operating state may have a cellular-favored sub-state and a GNSS-favored sub-state that may be selected between in the manner described above. In other embodiments, the set of operating states may define a spectrum of resource allocations between GNSS-favored and cellular-favored, and the resource allocation logic may shift to the next state on the spectrum (in either direction) based on current conditions.

Further, as described above, a set of operating states, or resource allocations, may be defined related to resource sharing among other combinations of signal types, e.g., cellular with any or all of GNSS, WLAN, or Bluetooth. Each defined operating state may establish a priority for each signal type that shares a resource, with the resource allocation favoring the highest priority signal type over the other signal types, subject to constraints on the minimum signal quality for one or more of the other signal types. An operating state from the set can be selected dynamically based on current operating context, such as: whether a call is in progress; type of call (e.g., E911 or other); location of the device (e.g., indoors, various outdoor environments); quality of service metrics for various services; usage patterns (e.g., allocating fewer resources to idle communication services); power consumption (e.g., favoring low power); and so on. As described above, a device can reassess its operating context periodically and/or in response to specific events (e.g., initiating or terminating a phone call, change of location, connecting to or disconnecting from a WLAN or a Bluetooth device) and can select an operating state according to a context-dependent prioritization of the signal types. The particular sets of operating states and prioritizations can be varied depending on the protocols the device supports and/or the types of available context information. Rules for establishing prioritization in different operating contexts may be optimized using heuristic information about real-world performance of various user devices.

All processes described herein are illustrative, and variations and modifications are possible. Operations described sequentially may be performed in parallel and order of operations may be modified; operations may also be combined or omitted.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method implemented in a user device having a communication interface configured to concurrently receive and process global navigation satellite system (GNSS) signals and cellular voice signals, the method comprising:
   determining whether a cellular voice call is in progress;
   in response to determining that a cellular voice call is in progress:
   determining whether the cellular voice call is an emergency call; and
   in response to determining that the cellular voice call is an emergency call:
   identifying a GNSS scenario based on a current location estimation;
   determining a current quality of service metric based on received GNSS signals;
   determining a quality of service threshold based at least in part on the GNSS scenario;
   determining whether the current quality of service metric exceeds the quality of service threshold;
   if the quality of service metric exceeds the quality of service threshold, selecting a first operating state for the communication interface, wherein the first operating state prioritizes receiving and processing of cellular voice signals; and if the quality of service metric does not exceed the quality of service threshold, selecting a second operating state for the communication interface, wherein the second operating state prioritizes receiving and processing of GNSS signals.

2. The method of claim 1 further comprising:
in response to determining that the cellular voice call is not an emergency call, selecting the second operating state.

3. The method of claim 1 further comprising, in response to determining that a cellular voice call is not in progress:
determining whether to operate in the second operating state based in part on a quality of service metric for the GNSS signals.

4. The method of claim 1 wherein identifying the GNSS scenario includes classifying a current location in one of a plurality of categories associated with different degrees of GNSS signal obstruction.

5. The method of claim 4 wherein the plurality of categories includes a dense urban category, a foliage category, and an open-sky category.

6. The method of claim 1 wherein selecting the operating state further includes, in the event that the quality of service metric does not exceed the quality of service threshold:
performing a cellular coverage check to determine whether to select the first operating state or the second operating state.

7. The method of claim 6 wherein performing the cellular coverage check includes:
determining whether a base station trigger has been received; and
in response to determining that a base station trigger has been received, selecting a new cellular band based at least in part on an arbitration score associated with the new cellular band.

8. The method of claim 7 wherein performing the cellular coverage check further includes, in the event that a signal triggering a cellular handover operation has not been received:
determining whether to select the first operating state based at least in part on an arbitration score associated with a current cellular band.

9. A user device comprising:
a communication interface to send and receive wireless signals, the communication interface including a global navigation satellite system (GNSS) communication module to receive and process signals from a set of global navigation satellites and a cellular communication module to receive and process signals from a cellular voice network, wherein the GNSS communication module and the cellular communication module share at least some resources with each other and are concurrently operable;
the communication interface being operable in a plurality of operating states including a first operating state that allocates the shared resources to prioritize communications via the cellular voice network and a second operating state that allocates the shared resources to prioritize communications from the global navigation satellites,
the communication interface further including resource allocation logic configured to select an operating state for the communication interface from the plurality of operating states, the selection being based in part on whether a cellular call is in progress and in part on a quality of service metric determined for the GNSS unit,
wherein the resource allocation logic is further configured such that selecting an operating state for the communication interface includes:
determining whether a cellular voice call is in progress; and
in response to determining that a cellular voice call is in progress:
determining whether the cellular voice call is an emergency call; and
in response to determining that the cellular voice call is an emergency call, selecting one of the first operating state or the second operating state for the communication interface based in part on a quality of service metric for the GNSS signals.

10. The user device of claim 9 wherein the resource allocation logic is further configured such that the selection is further based in part on a call type of the cellular call that is in progress.

11. The user device of claim 10 wherein the call type is one of an emergency call or a non-emergency call.

12. The user device of claim 9 wherein the communication interface includes a plurality of antennas capable of receiving GNSS signals and wherein the resource allocation logic is further configured to select one of the plurality of antennas to be used for receiving GNSS signals.

13. The user device of claim 12 wherein the resource allocation logic is further configured such that the selection of one of the antennas is based on comparing a quality of service for GNSS signals received using different ones of the antennas.

14. The user device of claim 9 wherein the resource allocation logic is further configured such that selecting one of the first operating state or the second operating state for the communication interface further includes:
in response to determining that the cellular voice call is not an emergency call, selecting the second operating state.

15. The user device of claim 9 wherein the resource allocation logic is further configured such that selecting one of the first operating state or the second operating state for the communication interface further includes:
in response to determining that a cellular voice call is not in progress, determining whether to operate in the second operating state based in part on a quality of service metric for the GNSS signals.

16. The user device of claim 9 wherein the resource allocation logic is further configured such that selecting one of the first operating state or the second operating state for the communication interface further includes:
identifying a GNSS scenario based on a current location estimation;
determining a current quality of service metric based on received GNSS signals;
determining a quality of service threshold based on the GNSS scenario; and
determining whether the current quality of service metric exceeds the quality of service threshold,
wherein the first operating state is selected if the quality of service metric exceeds the quality of service threshold.

17. The user device of claim 16 wherein the resource allocation logic is further configured such that selecting one of the first operating state or the second operating state for the communication interface further includes:

in the event that the quality of service metric does not exceed the quality of service threshold, performing a cellular coverage check to determine whether to select the first operating state or the second operating state.

18. The user device of claim 17 wherein the resource allocation logic is further configured such that performing the cellular coverage check includes:

determining whether a base station trigger has been received; and in response to determining that a base station trigger has been received, selecting a new cellular band based at least in part on an arbitration score associated with the new cellular band.

* * * * *